United States Patent
Larson

(10) Patent No.: US 7,590,572 B2
(45) Date of Patent: Sep. 15, 2009

(54) SYSTEM AND METHOD FOR EFFICIENT RETURN PREPARATION FOR NEWLY-INDEPENDENT FILERS

(75) Inventor: Christopher A. Larson, Oceanside, CA (US)

(73) Assignee: Intuit Inc., Mountain View, CA (US)

( * ) Notice: Subject to any disclaimer, the term of this patent is extended or adjusted under 35 U.S.C. 154(b) by 462 days.

(21) Appl. No.: 11/610,868

(22) Filed: Dec. 14, 2006

(65) Prior Publication Data

US 2008/0147494 A1 Jun. 19, 2008

(51) Int. Cl.
G06F 17/22 (2006.01)
G07F 19/00 (2006.01)
G06Q 40/00 (2006.01)

(52) U.S. Cl. ............................ 705/31; 705/35; 705/36
(58) Field of Classification Search .................... None
See application file for complete search history.

(56) References Cited

U.S. PATENT DOCUMENTS

| 6,697,787 | B1 |   | 2/2004 | Miller |            |
|---|---|---|---|---|---|
| 7,234,103 | B1 | * | 6/2007 | Regan | 715/234 |
| 2002/0111888 | A1 | * | 8/2002 | Stanley et al. | 705/31 |
| 2002/0133410 | A1 | * | 9/2002 | Hermreck et al. | 705/19 |
| 2003/0061131 | A1 | * | 3/2003 | Parkan, Jr. | 705/30 |
| 2003/0233296 | A1 | * | 12/2003 | Wagner | 705/31 |
| 2004/0088233 | A1 | * | 5/2004 | Brady et al. | 705/31 |
| 2006/0026083 | A1 |   | 2/2006 | Wyle |  |
| 2006/0112114 | A1 |   | 5/2006 | Yu |  |
| 2006/0155632 | A1 |   | 7/2006 | Cherkas |  |
| 2006/0178961 | A1 | * | 8/2006 | Stanley et al. | 705/31 |
| 2006/0271451 | A1 | * | 11/2006 | Varughese | 705/31 |
| 2006/0282354 | A1 | * | 12/2006 | Varghese | 705/32 |
| 2007/0033117 | A1 | * | 2/2007 | Murray | 705/31 |
| 2007/0250418 | A1 | * | 10/2007 | Banks et al. | 705/31 |
| 2008/0071673 | A1 | * | 3/2008 | Howard et al. | 705/38 |

* cited by examiner

Primary Examiner—F. Zeender
Assistant Examiner—Mussa Shaawat
(74) Attorney, Agent, or Firm—Osha • Liang LLP

(57) ABSTRACT

A system and method for facilitating a transition from being a dependent of a parent tax filer to being a newly independent tax filer may include determining if a prior-year dependent will be responsible for filing his or her own tax return. The system and method may include obtaining permission from the parent tax filer to offer an evaluation of a tax program to the newly independent tax filer. If permission is granted, information relevant to the newly independent tax filer may be extracted from the parent tax filer's tax information. An invitation to evaluate the tax program may be sent to the newly independent tax filer on behalf of the parent tax filer. If the invitation is accepted, the extracted information may be used to seed a current tax return for the newly independent tax filer. If not, the extracted information may be deleted.

25 Claims, 17 Drawing Sheets

| Menu 1 Menu 2 Menu 3 Menu 4 | Menu bar 252 |
| □ △ ⌂ ◇ ☆ | Tool bar 254 |
| /dependents\ /tab 2\ /tab 3\ | Tab bar 256 | dependent information 620

Would you like to help Dependent 1 get set up to prepare his/her own tax return?　　☑ yes 621　　☐ no 622

Please enter Dependent 1's email address[1] so that he/she may be notified that his/her account information is available:　　field 625

Please enter a personal message to Dependent 1 (optional):

field 630

Note 1: This email address will not be used for any purpose other than the notification of the transfer of this dependent's account information as indicated here.

Display 250

FIG. 4

SYSTEM AND METHOD FOR EFFICIENT RETURN PREPARATION FOR NEWLY-INDEPENDENT FILERS

BACKGROUND

Tax preparation software programs (hereinafter referred to as "tax programs") are available from various vendors that assist users in preparing accurate Federal and/or State income tax returns and other tax forms. These tax programs may guide the user through income, property, sales, or other types of tax return processes for a governmental entity or agency (e.g., Federal, State, county, city, district, or other municipality) step-by-step, and may automatically perform necessary tax preparations in accordance with user-entered data input, forms, schedules, and tax data, tables, and formulas stored with or coded into the program. Personal and/or business tax programs may be provided. In addition, both personal and professional versions of these programs may be offered. Professional versions may be used by tax preparation professionals to prepare various tax returns for multiple customers. Further, these tax programs may be used to prepare annual taxes, quarterly taxes, etc.

Tax programs typically include electronic tax documents (e.g., the various forms, schedules, worksheets, etc. needed to prepare and file tax returns), which may be stored and accessed as electronic documents. For example, Federal tax return documents that may be provided may include, but are not limited to, 1040, 1040A, 1040EZ, 1040NR, and 1040X forms. In addition, various tax forms and schedules for various States may be included. These electronic tax return documents may be graphically presented by the tax program to the tax preparer on a display device (e.g., a computer monitor). Typically, the tax program will provide a user interface with various user interface elements (menus, dialog boxes, etc.) and user-selectable interface items (menu items, buttons, controls, text entry boxes, etc.) whereby the preparer may access the electronic documents as needed and enter and/or modify data on the various tax documents using one or more data entry/cursor control mechanisms, such as a keyboard and mouse. Typically, these electronic documents are presented on the user interface as templates that, when partially or completely filled out, may be "saved" for the particular taxable entity for which the documents are prepared. Typically, the preparer will enter the necessary data and information in the documents via the user interface, and, when finished, access the user interface to direct the tax program to complete the preparation of the tax documents. When this process is finished, and possibly verified, the tax return is complete. The completed tax return may be saved, may be printed, or in some cases may be electronically transferred to one or more specified destinations (e.g., via e-mail or other mechanisms used to electronically transfer data). For example, they may be electronically filed with the appropriate taxing authority.

Instead of or as an alternative to entering the necessary data and information directly into the electronic tax return documents (e.g., directly into a 1040 form), some implementations of tax programs may provide an input mechanism whereby the user inputs the necessary data and information into input fields on data entry displays presented to the user by the tax program. Data and information entered by the user via the input fields may then be automatically transferred into the appropriate locations on the tax return documents. The tax program may perform any necessary calculations using the entered data and information, and possibly data and information from other sources such as previous tax returns, to generate appropriate calculated values for certain fields of the tax return documents.

Some tax programs are configured to import historical tax return information or data for the user (e.g., tax return information or data from a previous year) for use in preparation of a current tax return using a same or different version of the same tax program. Thus, an experienced user of the tax program may find it easy to prepare his or her tax returns year after year using the same tax program. For a new user, however, the tax program process may be confusing and it may be difficult for him or her to know how to begin or what information to enter.

SUMMARY

Various embodiments of a system and method for facilitating the transition from being a dependent of a parent tax filer to being a newly independent tax filer are described. The methods may be embodied in program instructions configured to implement a tax preparation program, which may be executed by a user locally (e.g., on a desktop computer) or remotely (e.g., on a server of a tax preparation service) in different embodiments.

The methods may in some embodiments include determining if a prior-year dependent of a tax filer will be responsible for filing his or her own tax return. The prior-year dependent may be a child of the tax filer or may be any other related or unrelated person for whom the tax filer (who may also be referred to as a "parent tax filer") provides support and whom the tax filer is qualified to claim as a dependent according to applicable tax laws and regulations. The prior-year dependent may transition from being a dependent of the tax filer to being a newly independent tax filer due to a change in his or her filing status. For example, the status change may be based on the dependent having reached a certain age, having graduated from college or high school, having experienced an increase or decrease in his or her income, having become a dependent of another person, having experienced a change in guardianship, having executed a limited or general power of attorney, having returned to work after being disabled, having been recently married, separated, or divorced, having decided to file separately rather than jointly, or based on other circumstances.

The methods may in some embodiments also include determining if the dependent should be removed from the parent tax filer's current tax return, which may be separate from or independent of a determination that the dependent will be responsible for filing his or her own tax return. For example, a teenaged dependent may earn enough money to be required to file his or her own tax return, but may still be claimed as a dependent by a parent.

If the parent tax filer is no longer qualified to claim the dependent (e.g., if the dependent will claim himself) and/or if the dependent will file his or her own tax return, some or all personal and tax-related information corresponding to the dependent may be cancelled from the parent tax filer's tax information by deleting the dependent's information or otherwise disregarded the dependent's information when preparing the parent tax filer's return. For example, information related to the dependent may be marked as "inactive" or "not-applicable" for the purpose of preparing the parent tax filer's return. Other tax information in the parent tax filer's tax return or related documents may be modified to reflect the change in the dependent's status (e.g., a number of personal exemptions may be modified.)

In some embodiments, the methods may include obtaining permission from a parent tax filer to offer an evaluation of a tax program to a newly independent tax filer. If permission is granted, information relevant to the newly independent tax filer may be extracted from the parent tax filer's tax information and stored in a temporary tax information file for the newly independent tax filer. In some embodiments, temporary account information may be set up for the newly independent tax filer in response to permission being granted to offer an evaluation of the tax program. The account information may include a temporary or delayed authorization mechanism and the temporary account may not be converted to an active account until or unless the newly independent tax filer authorizes the creation of an active account and/or until or unless the newly independent tax filer's identity is verified when he or she attempts to activate the account after accepting an invitation to evaluate the tax program.

If permission is granted to offer an evaluation of a tax program to a newly independent tax filer, an invitation to evaluate the tax program may be sent to the newly independent tax filer on behalf of the parent tax filer (e.g., via an email or other electronic communication). In some embodiments, the invitation may include one or more generic, custom, or personal messages to the newly independent tax filer, encouraging him or her to evaluate the tax program, providing information about how to obtain and execute the tax program, or indicating that the tax program has been used successfully by the parent tax filer, for example. In some embodiments, the temporary tax information file may be attached to the invitation, while in others the temporary tax information file may be accessed by the tax program from a remote storage location at some time after the invitation is provided and preparation of a tax return for the newly independent tax filer has begun.

As previously noted, at some time after the invitation is provided (e.g. after the invitation is accepted), active account information may be created for the newly independent tax filer, along with any tax information documents necessary for the preparation of a tax return. In some embodiments, the information in the temporary tax information file may be used to seed a current tax return for the newly independent tax filer. Similarly, if the newly independent tax filer has previously used the tax program (e.g., an earlier revision of the tax program) to complete a tax return for one or more prior tax years, information from these prior-year tax returns may be imported into the current tax return, in some embodiments. For example, a newly independent tax filer may have earned enough money in a previous tax year (either the most recent prior tax year or another prior tax year) to have filed his or her own form 1040EZ, but may still have been claimed as a dependent on his or her parents' tax return for that year. For the current tax year, the newly independent tax filer may not qualify as a dependent of his or her parents. In some cases, the newly independent tax filer's income and/or investment activity may have changed such that he or she is required to file a form 1040 for the current tax year, rather than a form 1040EZ, and information from the prior year form 1040EZ may be imported into a current form 1040. Similarly, tax information from a prior year joint tax return may be imported into a current year tax return for a recently separated or divorced tax filer or for married tax filers who decide to file separately, rather than jointly, for the current tax year.

Upon the occurrence of one or more conditions, for example if the invitation to evaluate the tax program is declined, or if a pre-determined acceptance period expires before the newly independent tax filer accepts the invitation, the temporary tax information file may be deleted. In some embodiments, any temporary account information may also be deleted or disabled if the invitation is declined or expires.

The system and method for preparing a tax return for a newly independent tax filer using information extracted from a parent tax filer's information described herein may facilitate a smooth transition for the newly independent tax filer.

BRIEF DESCRIPTION OF THE DRAWINGS

FIGS. 2-4 illustrate exemplary displays and user interfaces that may be provided to a parent tax filer by a tax program, according to one embodiment.

Figure 1:
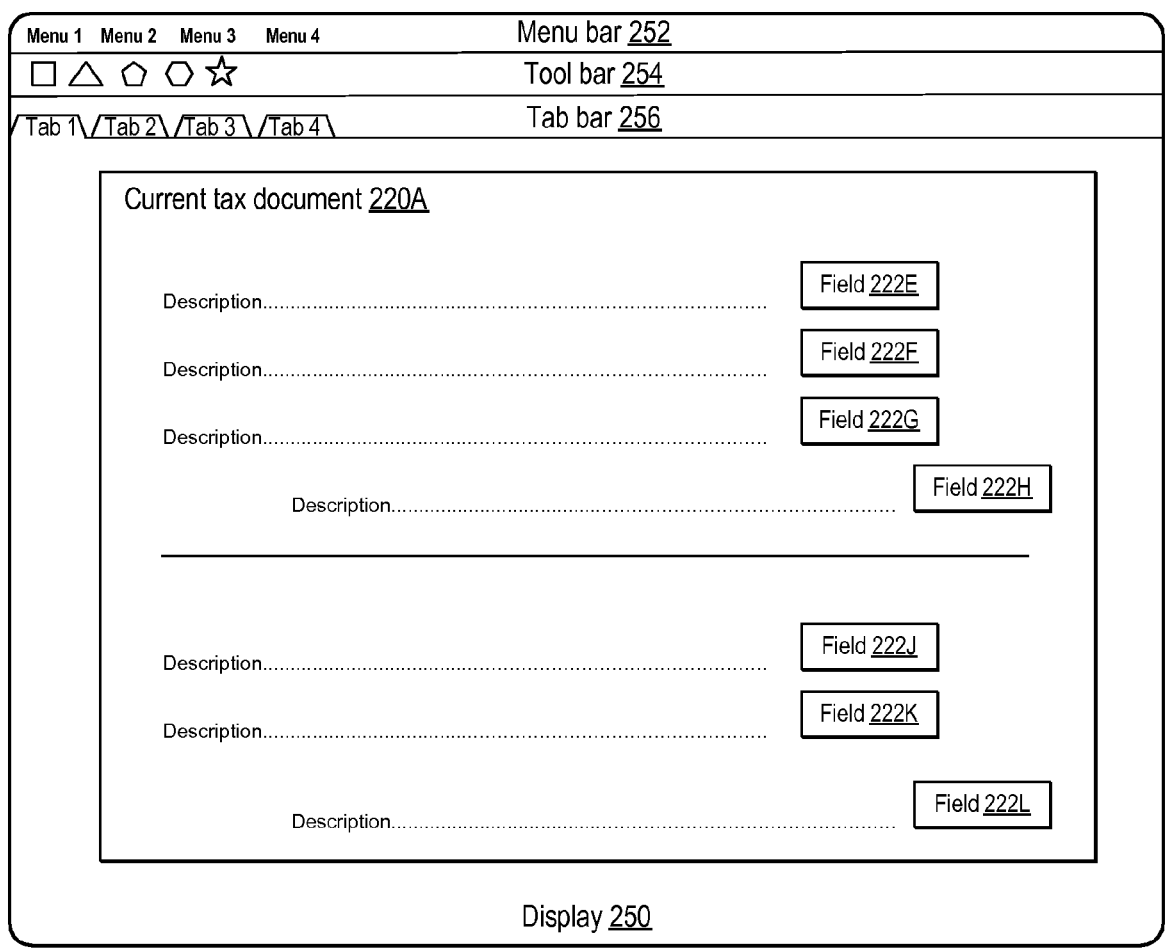
FIG. 1 illustrates an exemplary, generic display and user interface that may be provided by a tax program, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for facilitating the transition from being a dependent of a tax filer to being a newly independent tax filer are described. As used herein, the term "dependent" may in some cases refer to a child, step-child, or foster child of a tax filer, while in other cases, a dependent may be a parent, sibling, spouse, or any other related or unrelated person for whom the tax filer provides sufficient support to allow them to claim the dependent according to current tax laws and regulations. In the following descriptions, the term "parent tax filer" may be used to refer to an actual parent of a dependent or a newly independent tax filer or to any related or unrelated tax filer who was qualified to claim, and did claim, a newly independent tax filer as a dependent in one or more previous tax years. The methods described herein may be embodied in a tax program product, which may be implemented in multiple formats, including a desktop format and an online (e.g., web-based) format, and in multiple versions, such as a personal version or a professional version.

Tax programs may guide the newly independent filer through income, property, sales, or other type of tax return processes for a governmental entity step-by-step, and may automatically perform necessary tax preparations in accordance with user-entered data input, forms, schedules, and tax data, tables, and formulas stored with or coded into the program. Note that tax returns may be part of a broader class of financial returns. Financial returns may be defined as sets of one or more documents that may be prepared according to the requirements or at the request of some governmental entity for a specified reporting period. Therefore, "tax program" is used herein as an example of the broader class of financial return preparation programs, and "tax return" is used herein as an example of the broader class of financial returns. Embodiments described herein may apply to any type of return preparation program and the filing of returns.

Note that electronic documents related to the preparation of or filing of a tax return may be referred to herein as "tax electronic documents" or simply as "electronic documents." Electronic documents related to the preparation of or filing of a current tax return may be referred to as "current tax electronic documents" or in some cases "current tax documents", and electronic documents of a previous tax return may be referred to as "previous tax electronic documents" or in some cases "previous tax documents." Further note that electronic documents of a tax return as described herein are intended to include both tax return documents (e.g., 1040, 1040A, 1040EZ, 1040NR, and 1040X forms of a Federal tax return) and data entry displays that include input fields for entering data and information to be transferred into tax return documents. Further, note that the term "electronic documents", as used herein, may also include other types of electronic documents used in the preparation of tax returns, including but not limited to other electronic documents that are or were used as sources for data and/or information in current or previous tax returns, or that may be used to estimate future tax liabilities. An example would be an electronic W-2 Form, but other financial and non-financial electronic documents (e.g., income statements, balance sheets, and electronic documents produced by accounting or personal finance software packages) may also be used as source documents for preparing tax returns, and are also intended to be included.

The tax program described herein may in various embodiments include a graphical user interface for entering and displaying information and data relevant to preparation of tax return documents. FIG. 1 illustrates an exemplary, generic display and user interface that may be provided by a tax program according to one embodiment. Display 250 may include one or more of, but is not limited to, a menu bar 252, a tool bar 254, and a tab bar 256. Menu bar 252 may provide one or more menus for accessing various functionalities of a tax program via user-selectable interface items (i.e., menu selections). Tool bar 254 may provide one or more tool icons for accessing various tools of the tax program. Tab bar 256 may provide one or more tabs for switching between various views presented to the tax preparer. In the example illustrated in FIG. 1, the currently selected tab displays a current tax document 220A. Note that current tax document 220A is intended to be representative of both tax return documents (e.g., 1040, 1040A, 1040EZ, 1040NR, and 1040X forms of a Federal tax return) presented as templates for data entry by the user and data entry displays that include input fields for entering data and information to be transferred into tax return documents.

Current tax document 220A may include multiple fields 222. Values in these fields 222 may include values entered by the preparer via the user interface, values transferred from a previous tax return (as will be described later), or calculated values. Calculated values may be calculated from one or more other values, including values transferred from a previous tax return and values entered by the preparer via the user interface. Further, calculated values displayed in one field 222 may be used in calculating a value for another field 222.

In addition to displaying tax documents 220, display 250 may be configured to display other types of information and data input screens. For example, if other tabs on tab bar 256 are selected, the user (preparer) may be presented with various dialog screens for guiding the user through the tax return preparation process and for entering information and data relevant to preparation of a tax return. In various embodiments, these dialog screens may present instructions and explanations for the various tax return preparation steps, and may include various user interface mechanisms for entering data (e.g., text fields, data fields, radio buttons, check boxes, pull-down menus, etc.)

Figure 2:
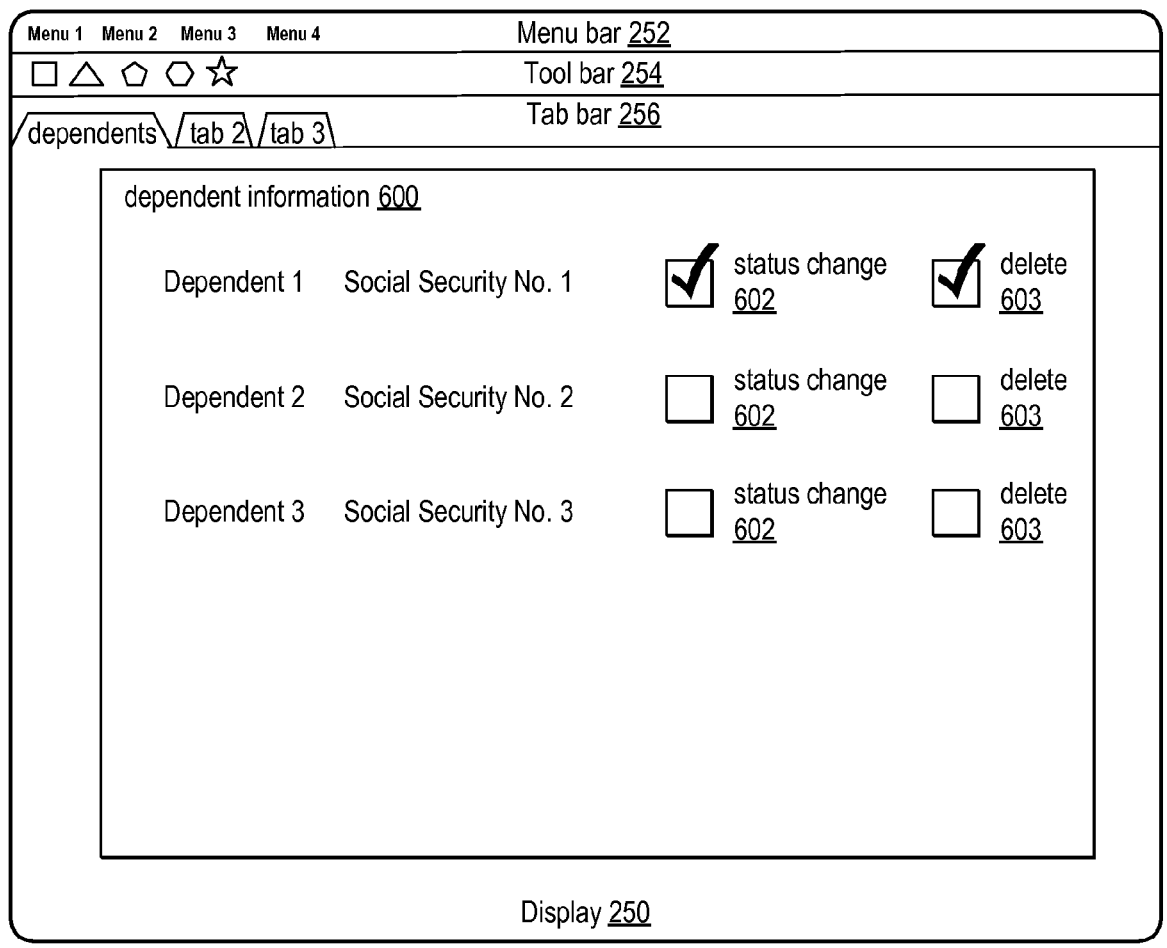

In various embodiments, the tax program may be configured to prompt a parent tax filer to indicate if there has been a change in status for any of the dependents listed on his or her prior-year tax return. For example, a dependent's status may have changed if he or she reached a certain age, graduated from college or high school, had an increase or decrease his or her income, became a dependent of another person, experienced a change in guardianship, executed a limited or general power of attorney, returned to work after being disabled, moved to an assisted living facility or nursing home, married, separated, divorced, or died. An exemplary tax program user interface for indicating a status change for a dependent is illustrated in FIG. 2. In this example, information about each of the dependents that were included in one or more prior-year tax returns of a parent tax filer (e.g., their names and social security numbers) are displayed as dependent information 600 within display 250, along with check boxes 602, which may be used to indicate whether or not the status of each dependent has changed. In this example, the parent tax filer has checked the check box 602 corresponding to Dependent 1, indicating that there has been a status change for this dependent. In various embodiments, additional check boxes, such as check boxes 603 illustrated in FIG. 2, may be used to indicate whether or not any of the dependents should be deleted from the parent tax filer's tax information for preparation of the parent tax filer's current tax return. In other embodiments, more or fewer check boxes may be used to indicate various types of status changes, or a different user interface mechanism (e.g., a pull-down menu, a data field, a radio button, etc.) may be used to indicate a change in status for a prior-year dependent and/or to indicate that a prior-year dependent should be removed from the parent tax filer's list of dependents. In some embodiments, a pull-down menu or set of radio buttons, for example, may be used to indicate the type of change (e.g., a move, a change in guardianship, an increase in income, a marriage, a death, etc.)

Figure 3:
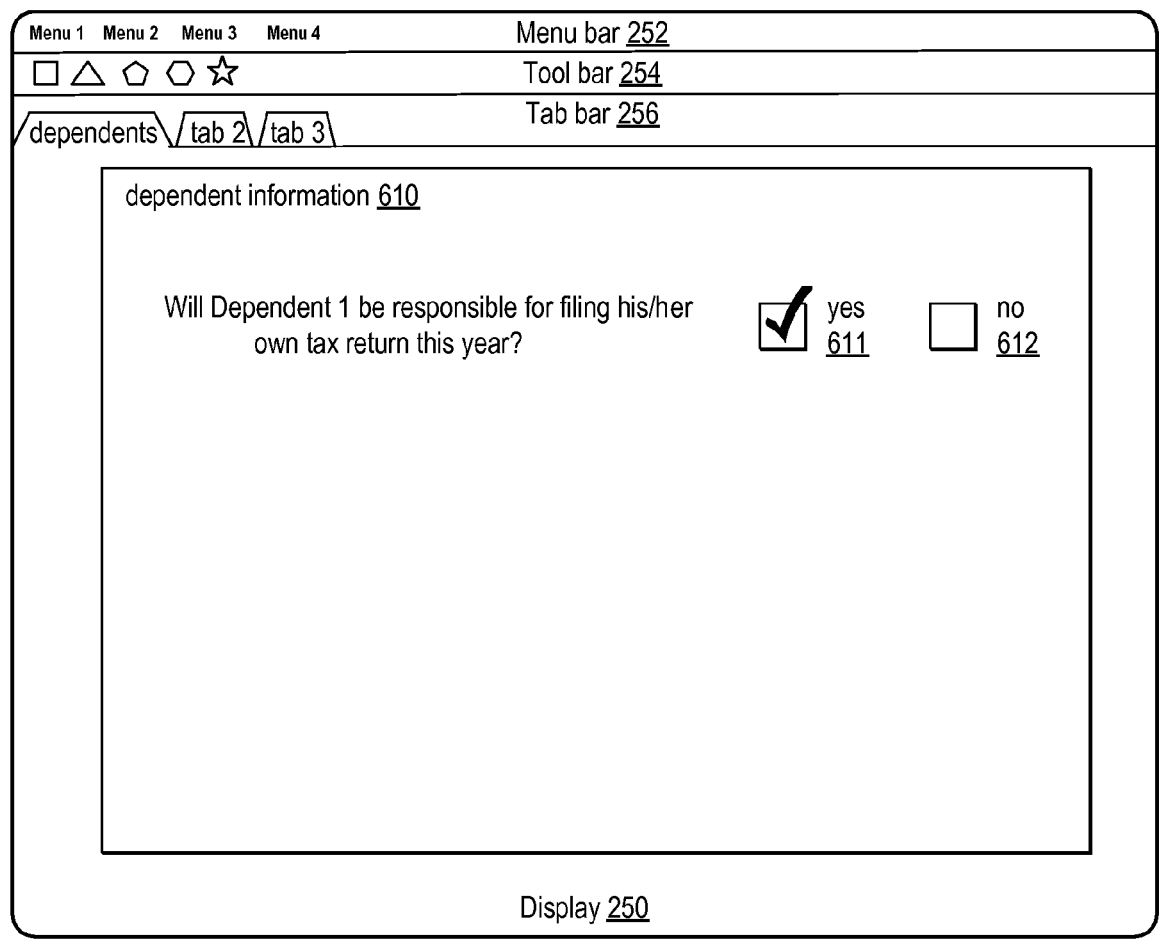

In some embodiments, in response to receiving input indicating that a dependent's status changed, a tax program may be configured to determine whether the dependent will be a newly independent tax filer and/or will be responsible for filing his or her own tax return in the current tax season. In some embodiments, the tax program may display a prompt for this information in response to receiving input indicating a change in a dependent's status. An exemplary user interface for indicating that a prior-year dependent will be responsible for filing his or her own tax return is illustrated in FIG. 3. In this example, dependent information 610 may be presented within display 250, listing any dependents for which a change of status was indicated, as illustrated in FIG. 2. Using this interface, the parent tax filer may check one of check boxes 611 and 612 to indicate whether or not Dependent 1 (i.e., a dependent for which a change in status was indicated) will be responsible for filing his or her own tax return. In other embodiments, other user input mechanisms may be used to indicate that a prior-year dependent will be responsible for filing his or her own tax return, or this may be determined programmatically in response to other information entered by the parent tax filer related to the change in status of the dependent. For example, if the parent tax filer inputs information indicating that a prior-year dependent's income has increased above a given threshold (such as a threshold set by applicable tax regulations), the tax program may be configured to determine that the dependent may be expected to file his or her own tax return, rather than including his or her income on the parent tax filer's tax return. In another example, if the parent tax filer inputs information indicating that the status change for a prior-year dependent is that the prior-year dependent has died, the tax program may be configured to determine that the dependent is not expected to file his or her own tax return, or that a separate tax return is not likely to be filed on his or her behalf, and may prompt the parent tax filer to confirm this assumption.

While many of the examples described herein involve a change in status for a prior-year dependent that results in the parent tax filer being disqualified from claiming the prior-year dependent as a current-year dependent, this is not always the case. Not all types of status changes that result in a prior-year dependent being responsible for filing his or her own tax return necessarily also result in the parent tax filer being disqualified from claiming the prior-year dependent as a current-year dependent. For example, if a teenaged dependent earns enough money (e.g., by working part-time or in the summer) to be required to file a tax return, he or she may still qualify as a dependent of the parent tax filer if the parent tax filer provides the majority of his or her support, according to various applicable tax regulations. In this example, the parent tax filer may list the prior-year dependent as a dependent on his or her current tax return and may claim a personal exemption for the dependent, while the dependent may file his or her own tax return but may not claim a personal exemption. Therefore, in some embodiments, a determination that a prior-year dependent will be responsible for filing his or her own tax return may be separate from (and/or independent of) a determination that a prior-year dependent does not qualify as a current-year dependent of the parent tax filer. In some embodiments, the tax program may be configured to advise the parent tax filer and/or the prior-year dependent about current tax regulations regarding qualifying as a dependent, claiming personal exemptions for a dependent, adjusting withholding allowances, etc., in response to an indication of a status change for a prior-year dependent. In the various descriptions included herein, the term "newly independent tax filer" may refer to a prior-year dependent who will: a) be responsible for filing his or her own tax return, b) no longer qualify as a dependent of the parent tax filer, or c) both, unless explicitly described as a particular one of the above.

In various embodiments, tax programs include information and data about a tax filer's dependents, such as their names, social security numbers, birthdates, income, filing status, marital status, disability status, etc. If a parent tax filer's prior-year dependent will be a newly independent tax filer, the tax program may in some embodiments be configured to extract historical tax return information or data about the dependent from the parent tax filer's prior-year tax return information and to save it in a temporary tax information file for the newly independent tax filer, either locally or remotely (e.g., on a server of an online tax preparation service). This information or data may be useful for the preparation of a current tax return for the newly independent tax filer. In some embodiments, the tax program may be configured to facilitate the transition for a prior-year dependent from being included on a parent tax filer's tax return to filing his or her own tax returns by extracting this information or data and using it in preparation of a tax return for the newly independent tax filer. For example, in some embodiments, the tax program may be configured to obtain permission from the parent tax filer to offer an evaluation of the tax program to the newly independent tax filer, and if permission is granted, to use the extracted information or data to seed a new tax return for the newly independent tax filer. Various methods for extracting, storing, transferring, and loading information or data of a parent tax filer's tax information for use in preparing a tax return for a newly independent tax filer are illustrated in FIGS. 8-11B and described in more detail below.

An exemplary user interface for obtaining permission to facilitate the transition from being a dependent of a parent tax filer to filing a separate tax return is illustrated in FIG. 4. In this example, dependent information 620 is presented to the parent tax filer within display 250. Dependent information 620 includes a prompt for the parent tax filer to indicate if he or she would like to help a newly independent tax filer (i.e., Dependent 1 in this example) get set up to prepare his or her own tax return. In this example, the parent tax filer may indicate that he or she would like to help the newly independent tax filer by selecting check box 621. In some embodiments, the parent tax filer may request and/or be presented with additional information about how the transition may be facilitated so that informed consent may be explicitly obtained. For example, the parent tax filer may be presented with a description of a process that includes one or more of: extracting tax information or data relevant to the newly independent tax filer from the parent tax filer's tax information, creating a temporary tax information document (e.g., an electronic document) including the extracted information or data, uploading and/or storing the extracted information or data on a server of an online tax preparation service, creating and/or sending a message to the newly independent tax filer inviting them to evaluate the tax program, setting up a temporary account for the newly independent tax filer, pre-loading the extracted information or data into a current tax return document (e.g., an electronic document) for the newly independent tax filer, allowing the newly independent tax filer to modify and/or add information or data to complete his or her tax return, and deleting the extracted information from the server if the invitation is ignored or declined, or when the newly independent tax filer's tax return preparation is complete.

If the parent tax filer indicates that he or she would like to help the newly independent tax filer get set up to prepare his or her own tax return, the parent tax filer may be prompted to input contact information for the newly independent tax filer, in some embodiments. For example, FIG. 4 illustrates that the parent tax filer may be prompted to enter an email address for the newly independent tax filer in field 625. In other embodiments, the parent tax filer may be prompted to enter a different type of electronic address (e.g., an email address, instant messaging identifier, or telephone/pager number). In this example, dependent information 620 within display 250 includes a disclaimer that the electronic address will not be used for any other purposes. In other embodiments, other types of information (e.g., instructions, explanations, or other disclaimers) may be presented to, or offered to, a parent tax filer when obtaining permission to facilitate the newly independent tax filer's transition in addition to, or instead of, the information illustrated in FIG. 4. In some embodiments, the tax program may be configured such that information and/or data relevant to the newly independent tax filer are not extracted from the parent tax filer's tax information until or unless the parent tax filer grants permission to offer an evaluation of the tax program to the newly independent tax filer, rather than in response to an indication that the prior-year dependent will be responsible for filing his or her own taxes.

In the example illustrated in FIG. 4, the parent tax filer may also be prompted to (optionally) enter a personal message to the newly independent tax filer, as in field 630. Including such a personal message in an invitation to evaluate the tax program may reduce the possibility that the newly independent tax filer will consider the invitation to be an unsolicited marketing message or "spam." For example, the personal message could include a statement from the parent tax filer indicating that he or she has successfully used the tax program, along with a greeting or sentiment that would be recognizable as having come from the parent tax filer (e.g., "Hi Scooter, I've been using this tax program for years and it works great! Since you have to file your own return this year, I think you should try it. Call me if you have any questions. Cheerio, Pops.")

If the parent tax filer grants permission to offer an evaluation of the tax program to the newly independent tax filer, the tax program may be configured to contact the newly independent tax filer and to offer the evaluation. In some embodiments, the tax program may be configured to send an email or other electronic message (e.g., an instant message or text message) to the newly independent tax filer on behalf of the parent tax filer, including instructions for executing the tax program (e.g., by logging into an online service, downloading a desktop version of the tax program, or purchasing a CD-ROM containing a copy of desktop version of the tax program.) The message may also include a personal message from the parent tax filer, as described above. The message may in some embodiments include an electronic coupon (e.g., for a free or discounted copy of the tax program), instructions for obtaining an electronic or physical coupon or rebate information for the tax program, or instructions for obtaining and/or executing a "new user", "student", or "low income" version of the tax program free or at a reduced rate. In other embodiments (e.g., in embodiments in which the parent tax filer uses a desktop version of the tax program rather than an online version), the parent tax filer may be prompted to contact the newly independent tax filer, such as by sending an electronic message recommending the tax program and including instructions for obtaining and/or executing the tax program. In such embodiments, the parent tax filer may also be prompted to attach a file (e.g., an electronic document) to the message containing the extracted information and data relevant to the newly independent tax filer. The parent tax filer may also be prompted to include an electronic coupon or instructions for obtaining an electronic or physical coupon or rebate information for the tax program in the message, in some embodiments.

Once the parent tax filer has indicated his or her interest in helping the newly independent tax filer get set up to file his or her own tax return, the tax program may be configured to guide the parent tax filer through the process of completing his or her tax return. In some embodiments, if one of the parent tax filer's prior-year dependents is a newly independent tax filer, the tax program may be configured to remove information and data relevant to the newly independent tax filer from the parent tax filer's tax information or to mark it as "inactive" or "not-applicable". Other modifications may be made to the parent tax filer's tax information, including, for example, removing the newly independent tax filer from the list of dependents in the parent tax filer's return, modifying the number of personal exemptions on the parent tax filer's return, modifying the parent tax filer's filing status (e.g., if the parent tax filer no longer qualifies as a "head of household"), removing any pre-loaded information about the newly independent tax filer's prior-year income (e.g., information about interest income or investments held in the newly independent tax filer's name), or modifying or removing dependent care expenses of the parent tax filer's tax return. As previously noted, a determination that a prior-year dependent may be responsible for filing his or her own tax return may be separate from and/or independent of a determination that the prior-year dependent is, in fact, "newly independent" (i.e., that the parent tax filer may no longer claim him or her as a dependent). Therefore, in some embodiments, a prior-year dependent's information may not be removed from the parent tax filer's tax information unless the parent tax filer explicitly indicates that the prior-year dependent should be deleted, such as by checking check box 603 illustrated in FIG. 2 or inputting this information using another user input mechanism. In general, deleting a dependent from a parent tax filer's tax information may involve re-calculation or "cleanup" of various fields and forms of the parent tax filer's current tax return, some (but not all) of which are described herein.

As noted above, a newly independent tax filer may in some embodiments receive an invitation to evaluate the tax program used by a parent tax filer. In some embodiments, the invitation may be received via an electronic message from the parent tax filer or as generated and sent by the parent tax filer's tax program (e.g., a desktop copy or online version of the tax program). The invitation may in various embodiments include a generic invitation to evaluate the tax program (e.g., "A friend has invited you to use the tax preparation method that has worked for him"), a semi-custom invitation including limited information about the parent tax filer (e.g., "Robert L. Smith has invited you to use the tax preparation method that has worked for him"), a more custom invitation, such as one including the relationship between the parent tax filer and the newly independent tax filer (e.g., "Your father has invited you to use the tax preparation method that has worked for him"), and/or a personal message from the parent tax filer, such as the personal message described above ("Hi Scooter, I've been using this tax program for years and it works great! Since you have to file your own return this year, I think you should try it. Call me if you have any questions. Cheerio, Pops.")

In some embodiments, a copy of the tax program may be automatically invoked in response to the invitation being opened, or the newly independent tax filer may explicitly invoke execution of the tax program in response to receiving the invitation (e.g., by selecting a hyperlink in the message to execute an instance of the tax program in a browser window or to download, install, or execute a desktop copy of the tax program). In some embodiments, a "welcome" function of the tax program may be executed first in response to the tax program being invoked. In other embodiments, only the welcome function (or a similar function) may be executed in response to the newly independent tax filer opening or acknowledging the invitation and a complete copy of the tax program may not be invoked until or unless the newly independent tax filer accepts the invitation to evaluate the tax program. An exemplary display for one such welcome function is illustrated in FIG. 5.

Figure 5:
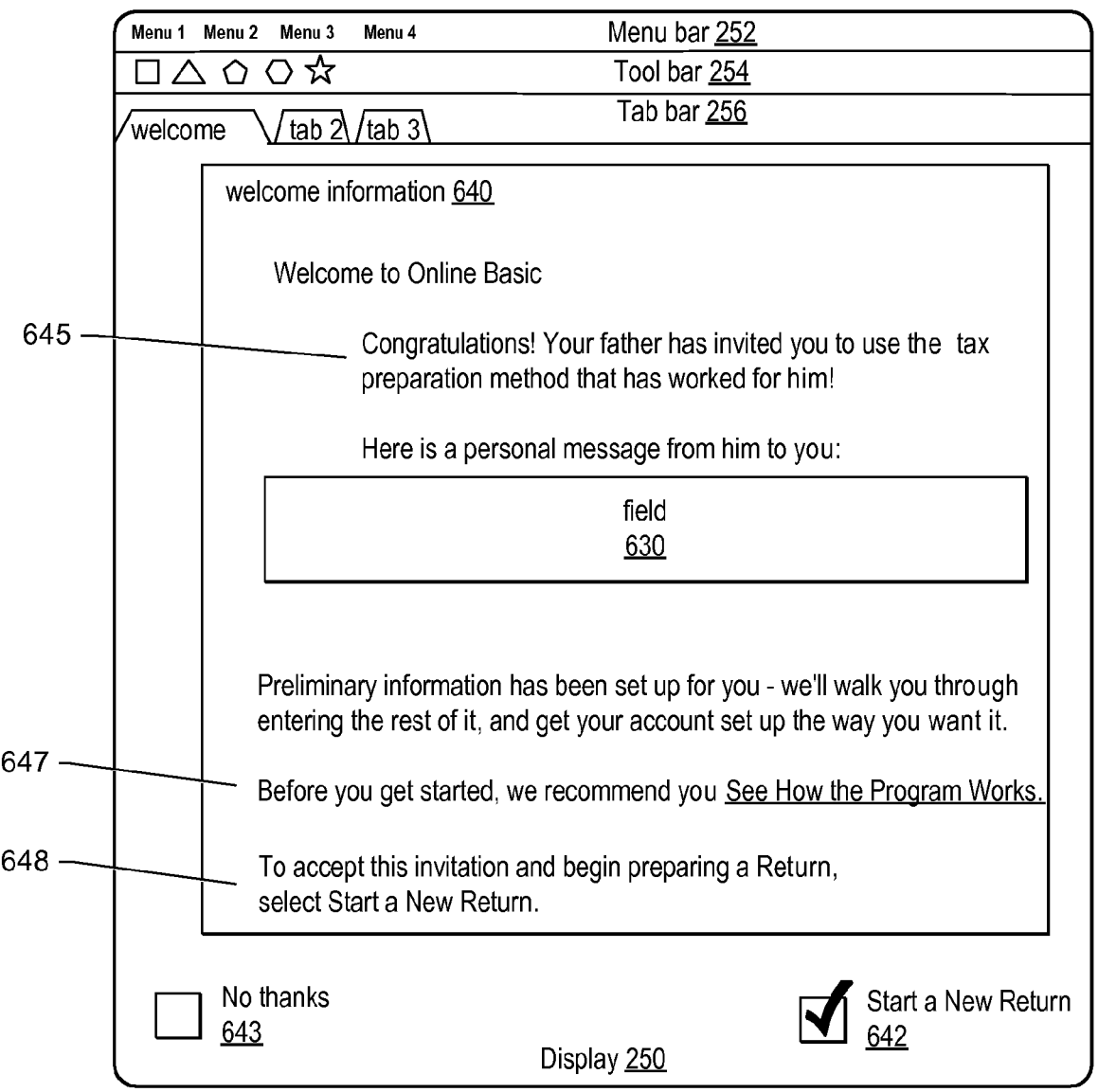
FIGS. 5-7 illustrate exemplary displays and user interfaces that may be provided to a newly independent tax filer by a tax program, according to one embodiment.

In the example illustrated in FIG. 5, welcome information, such as welcome information 640 within display 250, may be presented to the newly independent tax filer in response to opening or otherwise acknowledging receipt of an electronic message (e.g., an email) containing the invitation. In this example, welcome information 640 may include a generic, semi-custom, or custom introductory message, such as message 645 illustrated in FIG. 5. Introductory message 645, in this example, includes a custom message based on knowledge that the parent tax filer is the father of the newly independent tax filer. In other embodiments, a semi-custom introductory message may be included that indicates only the name of the parent tax filer (e.g., "Robert L. Smith has invited you to use the tax preparation method that has worked for him.") If a personal message has been entered by the parent tax filer, as described above, this message may be included in a field of the welcome message (e.g., field 630, illustrated in FIG. 5.)

As illustrated in FIG. 5, welcome information 640 may in some embodiments include instructions for obtaining more information about the tax program. For example, information 647 includes a hyperlink to a new user tutorial and selection of this hyperlink may open a document or browser to present the tutorial to the newly independent tax filer. Welcome information 640 may also include instructions for accepting the invitation to evaluate the tax program, such as instruction 648. In this example, instruction 648 directs the newly independent tax filer to accept the invitation and begin preparation of a tax return by selecting check box 642 (labeled, "Start a New Return".) In other embodiments, accepting the invitation and initiating preparation of a new tax return may involve separate operations and/or may be performed using another user input mechanism (e.g., selecting an operation from a pull-down menu, selecting one or more radio buttons, entering information in a data field, etc.) If the newly independent tax filer does not want to accept the invitation, he or she may indicate this by selecting an alternate check box, such as check box 643 of FIG. 5, or may simply ignore the invitation, according to various embodiments.

Figure 6:
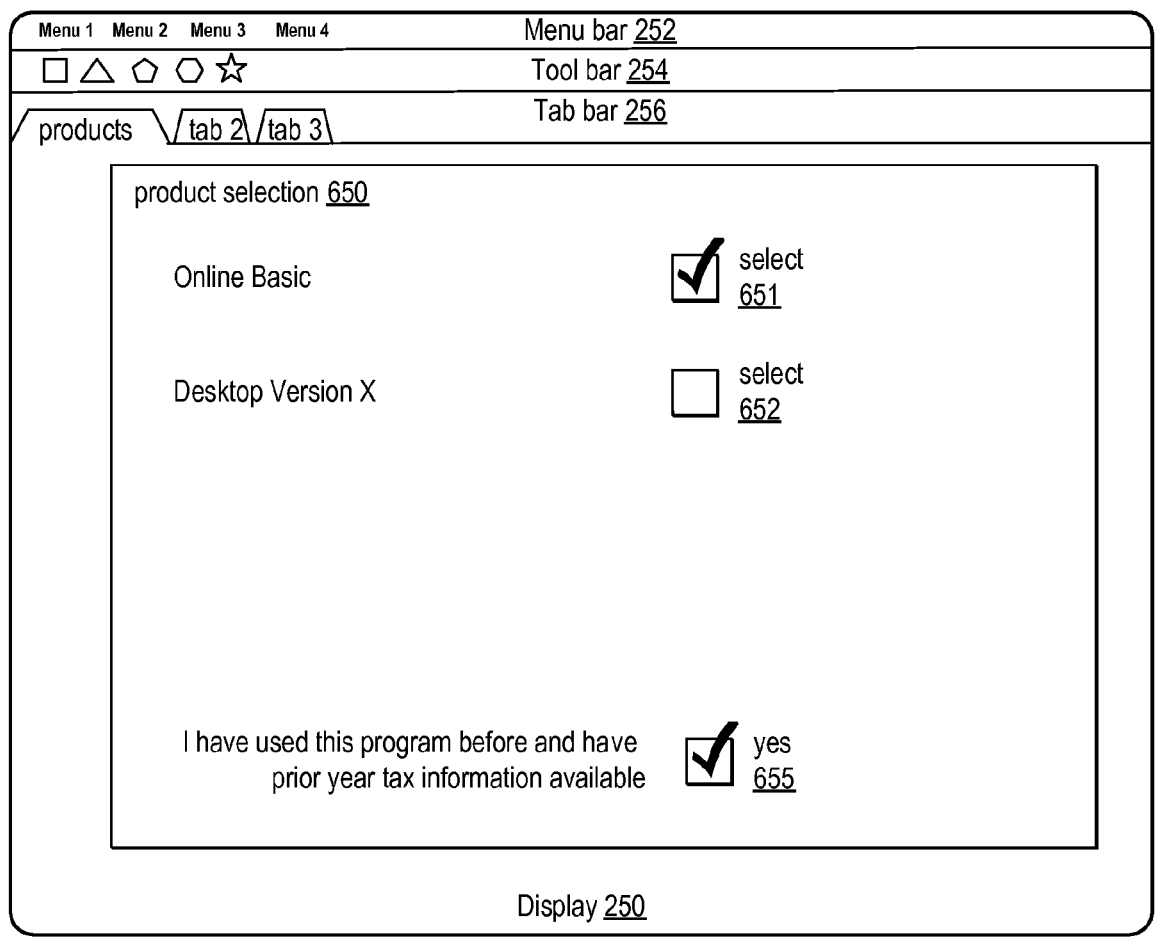

If the newly independent tax filer chooses to accept the invitation to evaluate the tax program, he or she may be prompted to select a particular format or version of the tax program to evaluate. For example, in some embodiments, the newly independent tax filer may be able to select an online format or a desktop format. An exemplary product selection interface is illustrated in FIG. 6. In this example the newly independent tax filer may select one of check boxes 651 or 652 to indicate his or her choice of tax program formats. In other embodiments, the newly independent tax filer may be given a choice of tax program versions (e.g., a basic, deluxe, personal, or professional version) or even a choice of tax program revisions (e.g., a most recent release or a previous release of the tax program.) While the product selection mechanism illustrated in FIG. 6 includes check boxes, product selection may in other embodiments be performed using other user input mechanisms, such as pull-down menus or text/data fields.

As illustrated in FIG. 6, the newly independent tax filer may be prompted to indicate if he or she has used the tax program before. In the example illustrated in FIG. 6, the newly independent tax filer may indicate this by selecting check box 655, although other input mechanisms may be used for this input. As previously noted, a truly independent tax filer (i.e., one that may no longer be claimed as a dependent by a parent tax filer) may or may not be a new tax filer, since the determination of these two conditions may be separate and/or independent of each other. For example, the newly independent tax filer may have earned enough income, and/or met other conditions, in one or more prior tax years such that he or she was required to file a tax return, even while he or she was legitimately claimed as a dependent by the parent tax filer.

Figure 7:
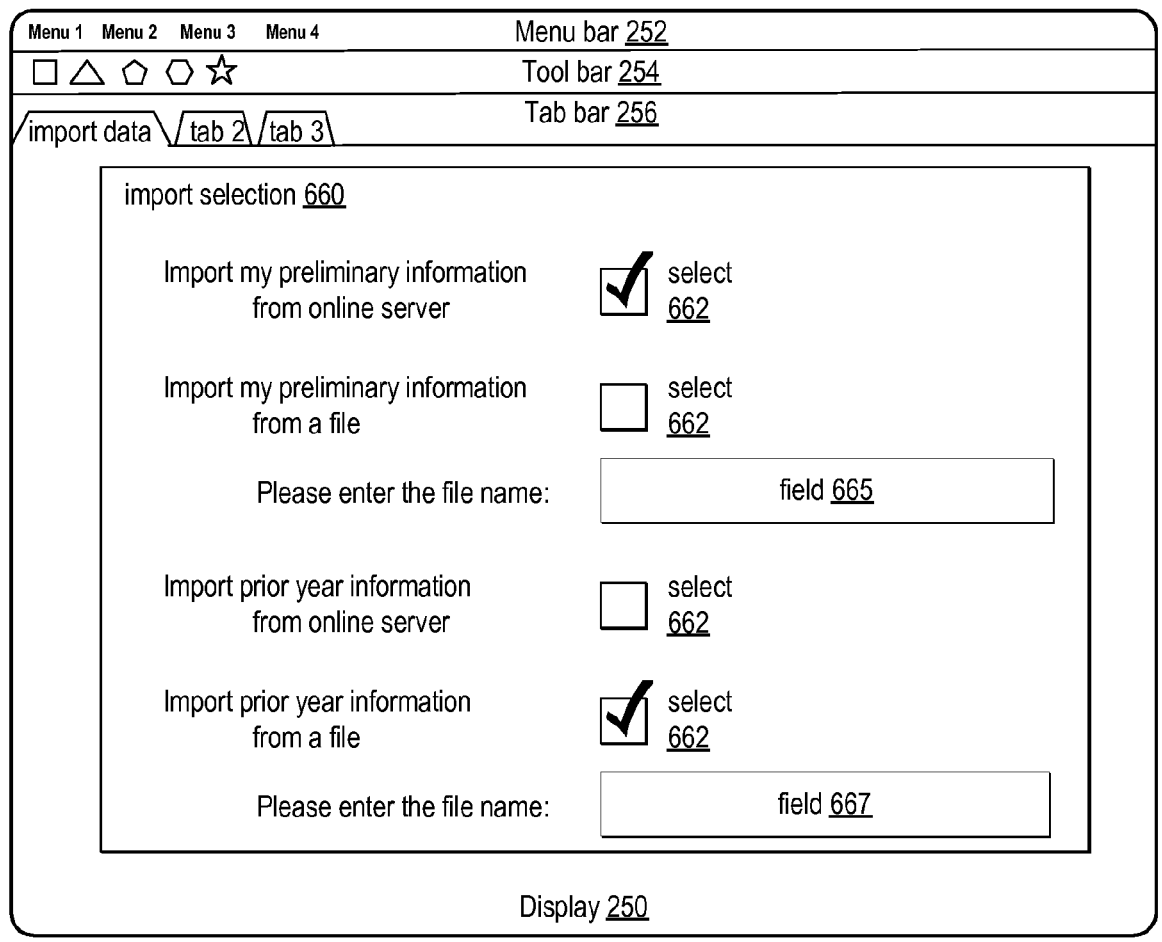

The newly independent tax filer may in some embodiments be prompted to enter information indicating one or more sources for information and data relevant to preparation of his or her current tax return. For example, FIG. 7 illustrates an exemplary import selection window 660 within display 250 for use in specifying one or more sources for such information or data. In this example, the newly independent tax filer may indicate that preliminary tax information (e.g., information extracted from a parent tax filer's tax information) may be imported from a server of an online service (e.g., if the extracted information was saved on the server by the parent tax filer's tax program) or from a file (e.g., if the parent tax filer saved the extracted information to a file and sent it to the newly independent tax filer). Similarly, if the newly independent tax filer indicates that prior-year tax information is available, the source of this information may be indicated through import selection window 660. In this example, the selection of a source for preliminary and/or prior-year tax information is made using check boxes 662, although other user input mechanisms may be employed in other embodiments. In this example, if a file is indicated as a source of information, an additional input may be entered (e.g., in field 665 or field 667) specifying the name and/or location of the file.

As noted above, in different embodiments, different methods may be employed for extracting, storing, transferring, and loading information or data of a parent tax filer's tax information for use in preparing a tax return for a newly independent tax filer. For example, information and/or data from a parent tax filer's prior-year 1040 form may be transferred to a temporary file (e.g., an electronic document) for the newly independent tax filer. This information and/or data may then be used by the tax program to seed a current tax return for the newly independent tax filer, such as by pre-loading various information and data from the temporary file into a current tax return for the newly independent tax filer or by using the information and data from the temporary file to calculate other values needed for preparation of the newly independent tax filer's current tax return.

In some embodiments, only the dependent's name and social security number may be extracted from the parent tax filer's tax information. In other embodiments, the parent tax filer's address, phone number, or other contact information (such as the parent tax filer's email address, or the name, address or phone number of a tax preparation professional used by the parent tax filer) may be extracted from the parent tax filer's tax information and used as preliminary contact information for the newly independent tax filer. The information or data that may be extracted from the parent tax filer's tax information may include text and data values from various fields of the parent tax filer's tax return forms, e.g. the newly independent tax filer's prior-year gross or net income from various sources, total taxes, data on assets or liabilities, information on capital gains or losses, depreciation information, etc., which may have been included in the parent tax filer's previous tax return information if the newly independent tax filer was not required to file a separate tax return for the particular prior tax year. In general, any information or data that may be relevant to the newly independent tax filer's tax information may be extracted from the parent tax filer's tax information.

In various embodiments, the extracted information or data may be transferred directly into an electronic document of a current tax return for the newly independent tax filer, rather than being extracted and saved in a temporary file for later use. For example, in some embodiments, if a newly independent tax filer accepts an invitation to evaluate the tax program, the tax program may be configured to extract relevant information and/or data from a parent tax filer's tax information stored on a server and to load it directly into a new electronic document for the newly independent tax filer. Several exemplary data flow diagrams depicting extracting information and/or data and using the extracted information and data are illustrated in FIGS. 8, 9, 10A-10B, and 11A-11B, and are described in detail below.

Figure 8:
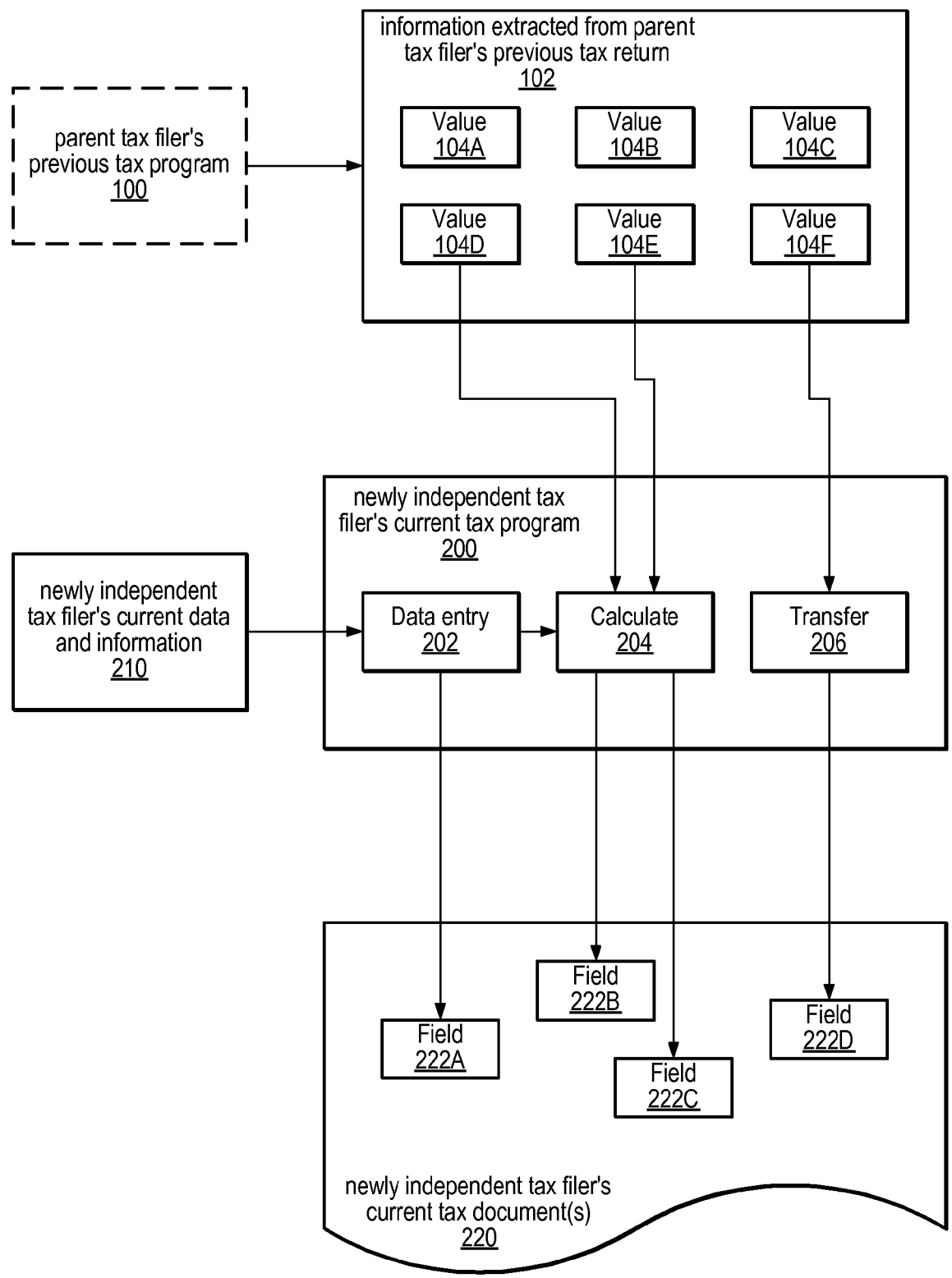
FIGS. 8-9 illustrate exemplary data flows in preparing a tax return using a current tax program and information from a parent tax filer's previous tax return, according to different embodiments.

In the first example, illustrated in FIG. 8, current tax program 200 may be installed and executed on a computer system. The computer system may typically be, but is not limited to, a personal computer (PC) such as a desktop computer, laptop, or notebook computer. Alternatively, current tax program 200 may be a network- or web-based tax return preparation program, in which users may prepare various tax electronic documents via a connection to a remote computer system (e.g., a server), without necessarily installing a tax program on their local computer systems (such as a personal computer or laptop). Note that current tax program 200 may be a personal or professional version, in different embodiments.

A newly independent tax filer may execute current tax program 200 to prepare his or her current tax return. Upon initiation of preparation of a current tax return for the newly independent tax filer, tax program 200 may provide a mechanism or mechanisms by which the newly independent tax filer may import at least a portion of the tax information generated by or stored by a parent tax filer's previous tax program 100 for use in filling in portions of the newly independent tax filer's current tax return. In various embodiments, the parent tax filer's previous tax program 100 may be, for example, a prior-year revision of current tax program 200 and/or a different version of current tax program 200 (e.g., one may be a desktop version and one may be a web-based version). A relevant subset of the parent tax filer's information and data may be extracted from the parent tax filer's information and data, as described herein. A portion of this subset is shown in FIG. 8 as information 102, which includes data values 104A-104F. In this example, values 104D, 104E, and 104F are transferred to current tax program 200 for use in preparation of the newly independent tax filer's tax return.

Note that the extracted information 102 that may be transferred to current tax program 200 may include textual information, such as the newly independent tax filer's name, address, and other similar information, and data values 104 that were entered into, transferred into, or calculated using previous tax program 100. As previously described and illustrated in FIG. 7, tax program 200 may in one embodiment provide one or more user interface items through which the newly independent tax filer may select a source from which parent tax filer information 102 is to be extracted. In another example, tax program 200 may provide a user-selectable menu option for selecting a prior-year tax return of the newly independent tax filer from which to extract additional relevant information and/or data that may be transferred into the current tax return (e.g., a newly independent tax filer may select a prior-year joint tax return from which to extract information and data for use in preparing a current-year separate tax return following a separation or divorce).

Tax program 200 may provide a graphical user interface to guide or step the newly independent tax filer through one or more electronic documents (such as current tax document(s) 220, which may include various electronic forms, worksheets, schedules, data entry displays, etc.) to prepare a current tax return. These electronic documents may be presented to the newly independent tax filer as templates on a display device, and the tax program 200 may provide a data entry 202 mechanism with a user interface that allows the newly independent tax filer to enter and/or modify current data and information 210 in various fields of the current tax document(s) 220. Note that current tax document 220 is intended to be representative of both tax return documents (e.g., 1040, 1040A, 1040EZ, 1040NR, and 1040X forms of a Federal tax return) presented as templates for data entry by the user and data entry displays that include input fields for entering data and information to be transferred into tax return documents.

One or more of the values 104 from extracted information 102 may be directly transferred into fields 222 of current tax document(s) 220, in some embodiments. For example, in FIG. 8, value 104F is shown as being transferred directly into field 222D. Some values 104 from extracted information 102 may be used to calculate (as in 204) new values for other fields 222 in current tax document(s) 220. Note that inputs to a particular calculation to generate a new value for a field 222 may include one or more values from one or more sources. For example, a calculation may be performed that uses just one value 104 from extraction information 102 as input. In another example, a calculation may be performed that uses two or more values 104 from extracted information 102. In yet another example, a calculation may be performed that uses one or more values 104 from extracted information 102 and one or more values provided by the newly independent tax filer through the data entry 202 user interface. In addition, calculated values may be used as input into other calculations. Also note that some values used in calculations may be coded as "constants" into current tax program 200, or alternatively may be read into the tax program from a stored data file as needed.

Figure 9:
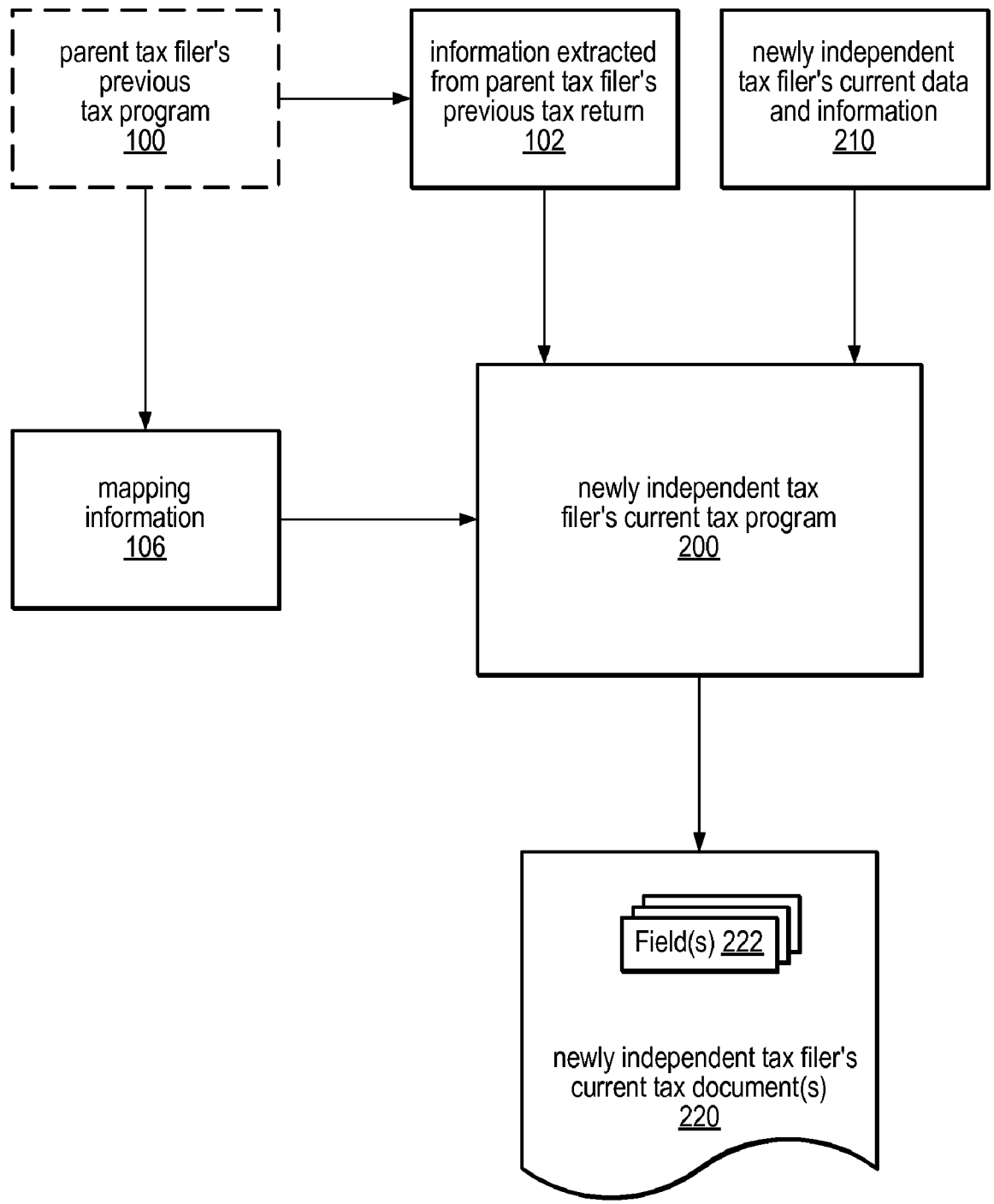

In the next example, illustrated by FIG. 9, current tax program 200 may be installed on a computer system and executed to prepare a current tax return for a newly independent tax filer, as described above. In this example, mapping information 106 may be used by current tax program 200 to cross-reference fields in previous tax electronic documents generated by previous tax program 100 to facilitate the transferal of values from extracted information 102 to the current tax document(s) 220. Mapping information 106 may, for example, have been generated by previous tax program 100 when generating the parent tax filer's prior-year tax return. In some embodiments, mapping information 106 may include information that maps particular fields 222 of newly independent tax filer's current tax return to corresponding fields in various electronic documents of the parent tax filer's prior-year tax return, such as when previous tax program 100 and current tax program 200 are different revisions of a same tax program version (e.g., a desktop version, or a professional version) or are various revisions of two different tax program versions.

Figure 10A:
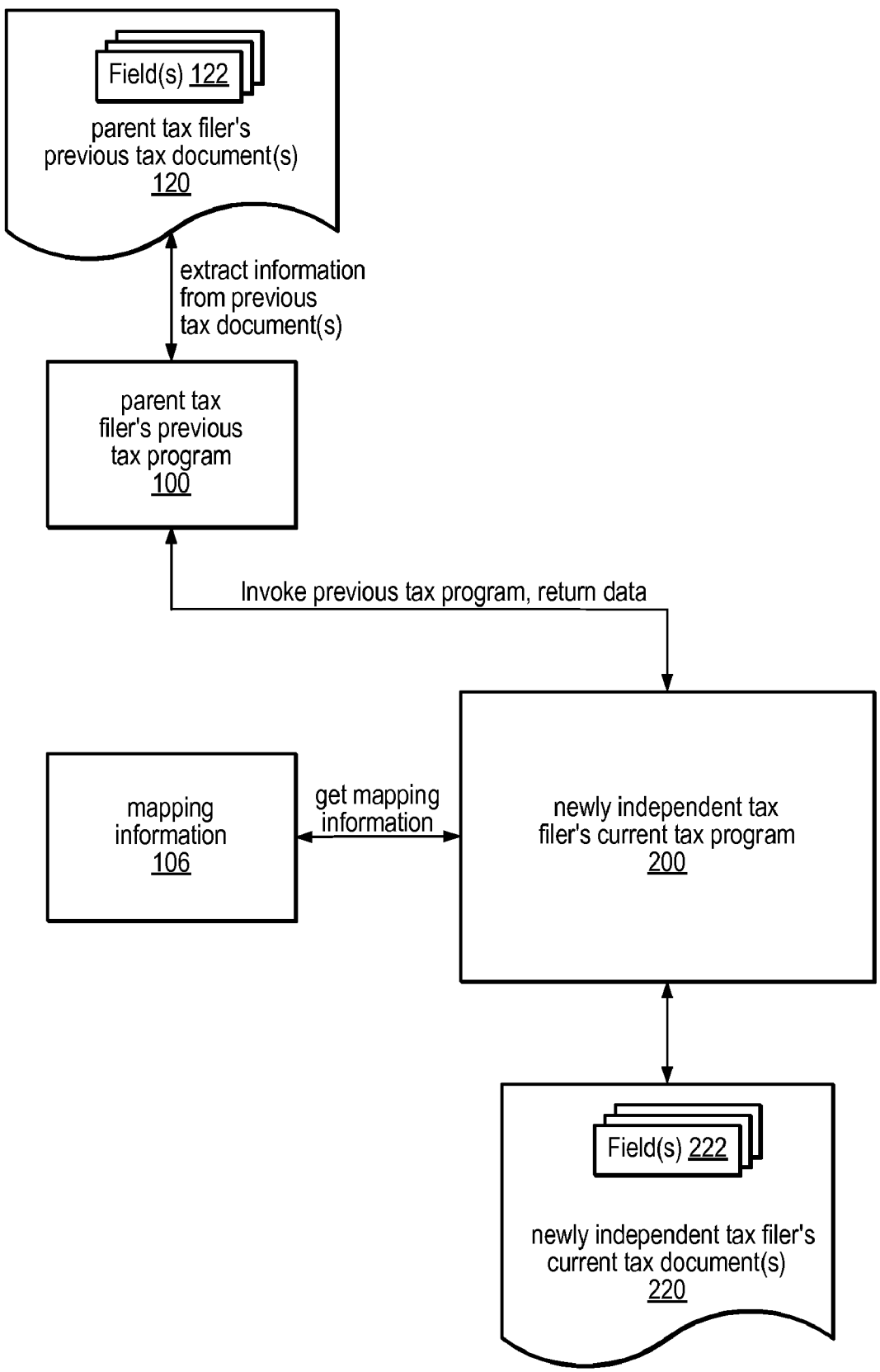
FIGS. 10A and 10B illustrate exemplary data flows for extracting information from a parent tax filer's previous tax documents and a former-dependent's previous tax documents, respectively.
Figure 10B:
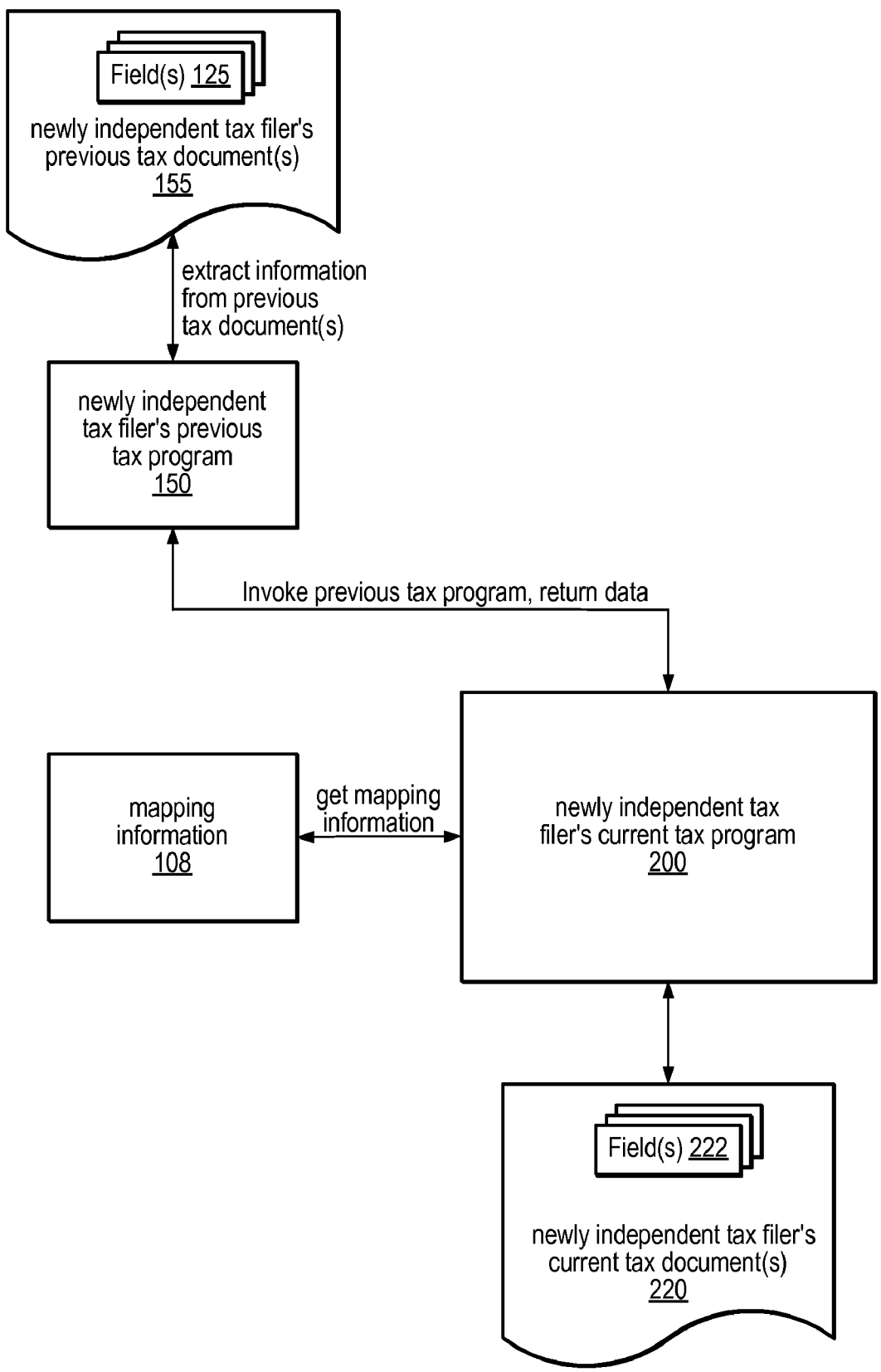

In the next two examples, FIGS. 10A and 10B illustrate "jumping back" from a current tax return document prepared by a current tax program to a previous tax document (e.g., a parent tax filer's tax document or a prior-year tax document of the newly independent tax filer) that is to be a source of the value in a field of the document, according to different embodiments. In the example illustrated by FIG. 10A, current tax program 200 may access mapping information 106 to determine the source electronic document(s) of a parent tax filer's previous tax return from which the value in the field should be transferred or calculated. Current tax program 200 may then use this mapping information 106 to invoke previous tax program 100 with appropriate instructions to display at least a portion of the document(s) from which a value for a selected field 222 should be imported or used in a calculation and to return the value(s) to be imported and/or used in the calculation. Previous tax program 100 may then execute and cause to be displayed the appropriate previous tax document(s) 120 and/or to extract the relevant information and/or data (e.g., extracted information 102). In an alternative embodiment, instead of invoking previous tax program 100 to display the parent tax filer's previous tax document(s) 120 and extract information 102, current tax program 200 may directly access and extract the information and/or data from the appropriate previous tax document(s) 120.

Similarly, FIG. 10B illustrates that current tax program 200 may in some embodiments access mapping information 108 to determine the source electronic document(s) of a prior-year tax return of the newly independent tax filer from which a value in the current tax document is to be transferred or used in a calculation. Current tax program 200 may then use this mapping information 108 to invoke previous tax program 150 with appropriate instructions to display at least a portion of the document(s) from which a value in a selected field 222 should be imported or used in a calculation and to return the value(s) to be imported and/or used in the calculation. Previous tax program 150 may then be executed and may cause the appropriate previous tax document(s) 155 to be displayed and/or the relevant information and/or data to be extracted. In an alternative embodiment, instead of invoking previous tax program 150 to display the newly independent tax filer's previous tax document(s) 155 and extract information and/or data, current tax program 200 may directly access and extract the information and/or data from the appropriate previous tax document(s) 155.

Figure 11A:
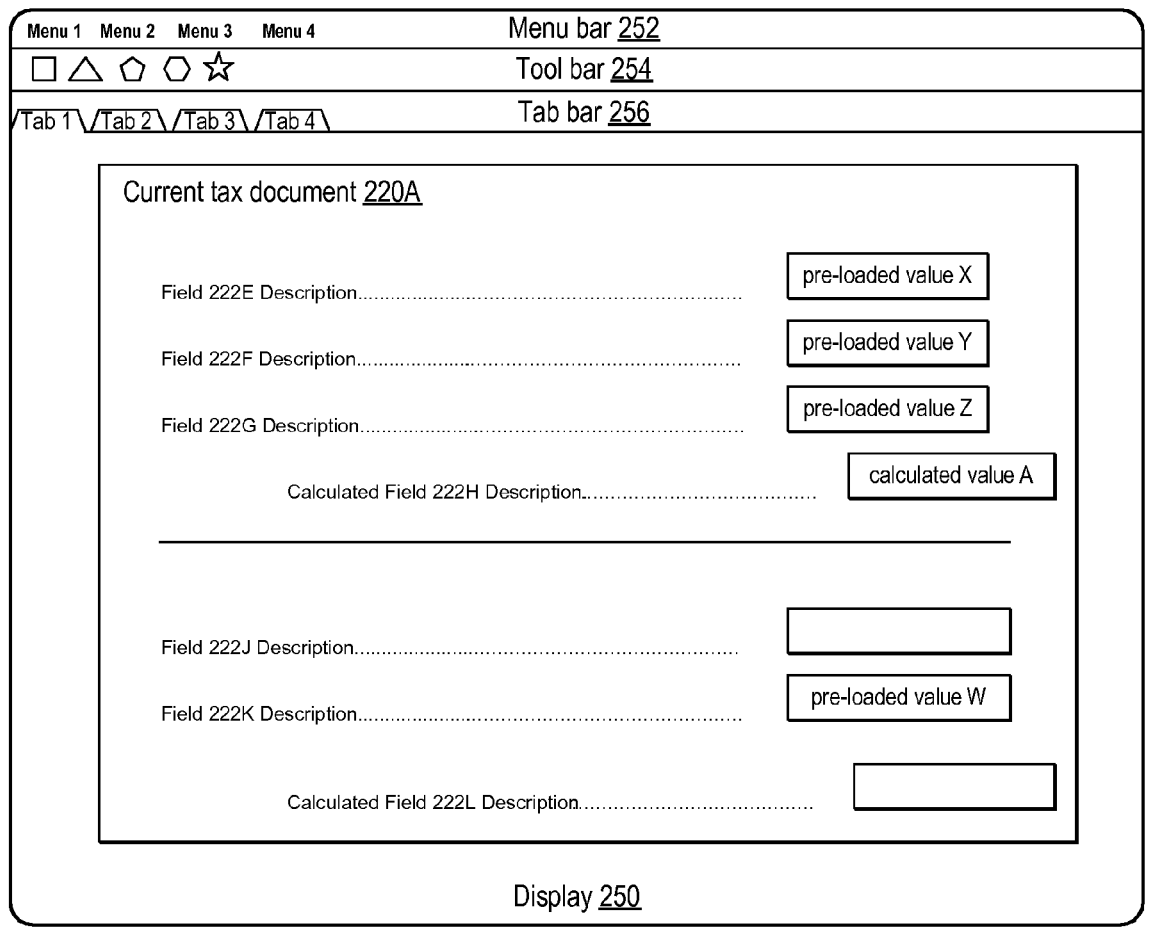
FIGS. 11A and 11B together illustrate pre-loading, displaying, and modifying tax return information using a current tax program, according to one embodiment.

Once relevant information and/or data has been extracted from a parent tax filer's tax information and/or from a prior-year tax return for the newly independent tax filer, by any of various methods including those described herein, the extracted information may be imported into current tax program 200 for use in preparation of the newly independent tax filer's tax return. Importing the extracted information may in some embodiments involve tax program 200 pre-loading various text and/or data fields of the newly independent tax filer's tax return with the extracted information or with values calculated using the extracted information. For example, FIG. 11A illustrates a current tax document 220A, including several fields that have been pre-loaded with information by tax program 200. In this example, fields 222E, 222F, 222G, and 222K have been pre-loaded with information imported from a parent tax filer's tax information and/or a prior-year tax return of the newly independent tax filer. In this example, a preliminary value of calculated field 222H has been calculated by tax program 200 using the pre-loaded information. In this example, no information was available for pre-loading field 222J, therefore, tax program 200 was not able to calculate a preliminary value for calculated field 222L.

Figure 11B:
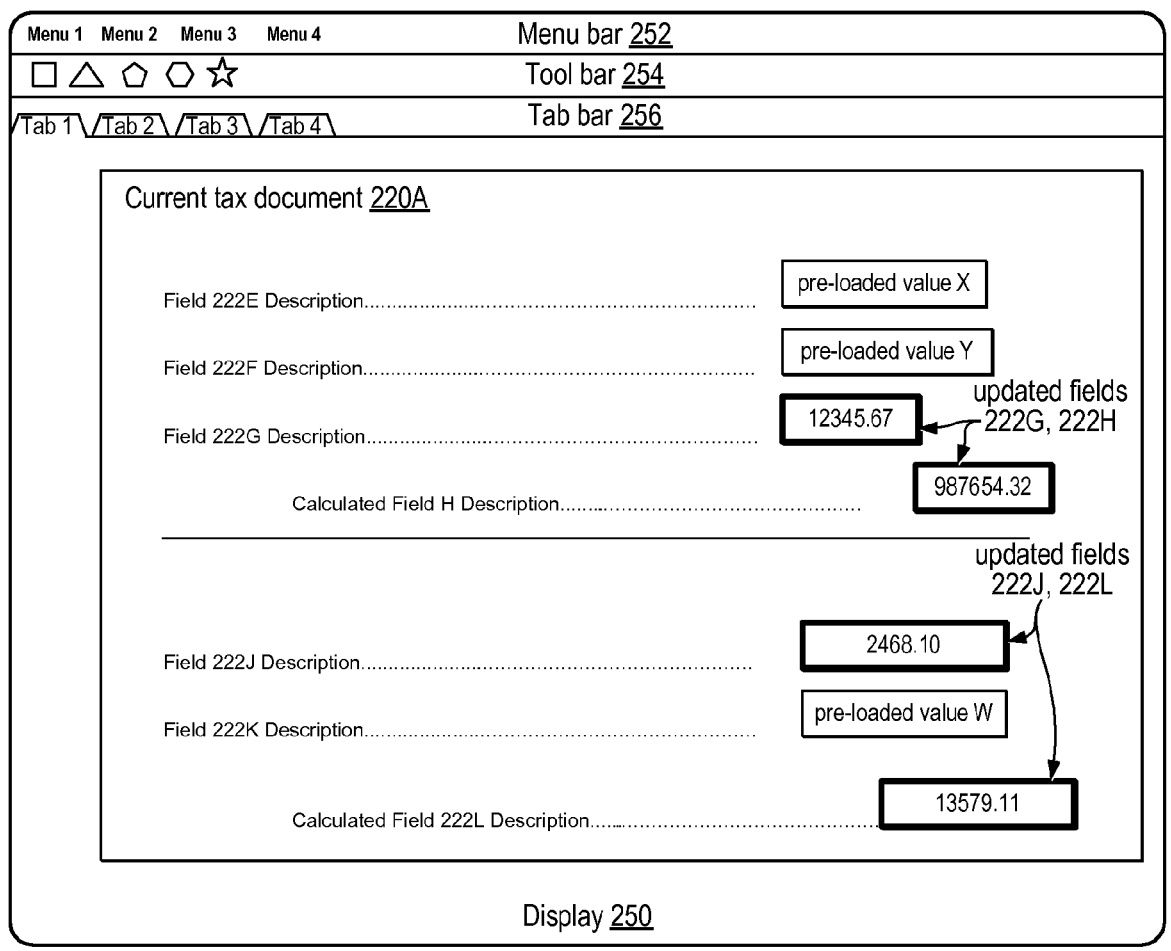

In some embodiments, tax program 200 may present current tax document 220A, including pre-loaded information and preliminary calculated values to the newly independent tax filer and may provide various user input mechanisms for the newly independent tax filer to modify and/or add information to various fields of current tax document 220A, such as the user input mechanisms described herein. FIG. 11B, for example, illustrates current tax document 220A after modifications and additions have been entered by the newly independent tax filer. In this example, the newly independent tax filer has modified the value of field 222G, entering an exemplary value of 12345.67. In response to this modification, tax program 200 has re-calculated the value of calculated field 222H and modified it accordingly (in this case to an exemplary value of 987654.32). In some embodiments, this re-calculation may be performed automatically in response to a change in a related field, while in other embodiments this re-calculation may be performed in response to an explicit command to re-calculate the value (e.g., by selecting a "re-calculate" function or an "update and continue" function.) In the example illustrated in FIG. 11B, the newly independent tax filer has added data to field 222J, in this case, the exemplary value 2468.10. Tax program 200 has, therefore, calculated a value for calculated field 222L using this information and has updated field 222L accordingly (in this case to an exemplary value of 13579.11). As noted above, this calculation may be performed automatically by tax program 200 in response to the update of field 222J or may be performed in response to explicit selection of an "update", "calculate", or "re-calculate" function, in various embodiments.

One of ordinary skill in the art will recognize that various user interface mechanisms for selecting and updating a field in a tax document may be used. For example, a preparer (e.g., the newly independent tax filer) may select a field 222G, as displayed by display 250, by using a tab or enter key on a keyboard to go to the field 222G in the display. As another example, a mouse or other cursor control device may be used to select a field 222G, for example by selecting the field with a mouse. One of ordinary skill in the art will also recognize that various user interface methods for highlighting a selected field in a document, including bolding an outline or border may be employed by tax program 200. Once a field is selected, tax program 200 may provide one or more user interface mechanisms and elements for invoking functionality to add or modify a value for the selected field 222G. As an example, in one embodiment, a mouse or other cursor control device may have two buttons. In this embodiment, the preparer may right-click the mouse when the cursor is on the field 222G (note that the right-clicking of the cursor control device may also serve to select the field 222G, as described above). In one embodiment, right-clicking on the field 222G may automatically cause the pre-loaded information for the field to be cleared. In one embodiment, right-clicking may cause a pop-up menu, or alternatively a dialog, to be displayed, from which the preparer may select from among one or more options for a value for the selected field or through which the preparer may enter a value for the selected field by typing the value on a keyboard. In another embodiment, once a field 222G is selected, a menu in menu bar 252 may be accessed by the preparer to select a value from a menu. Similarly, in another embodiment, one or more of the tool icons in tool bar 254 may be configured to display and/or modify a value for a selected field 222G.

By displaying instructions and explanations, pre-loading and/or pre-calculating various fields of a tax return document for a newly independent tax filer, and allowing the newly independent tax filer to modify and add information and data, tax program 200 may guide the newly independent tax filer through completion of the preparation of his or her tax return in much the same manner as described above regarding tax programs in general.

It should be understood that the computer-implemented methods for facilitating a smooth transition for a newly independent tax filer described herein as being embodied in one or more versions or revisions of a tax program (e.g., a tax preparation program) may be implemented using various combinations of computer hardware and program instructions embodied on various types of computer media for execution on the computer hardware. In general, the methods may be implemented in any combination of hardware and program instructions suitable for carrying out the functionality described herein. For example, the methods may be implemented as functions or software program modules integrated within a tax program (e.g., a tax return preparation tool) or as a separate or optional additional module available to a user (e.g., through an installation option of a desktop or download version, or as a separate function of an online tax preparation service). The flow charts in FIGS. 12-14 further illustrate the computer-implemented methods described herein.

Figure 12:
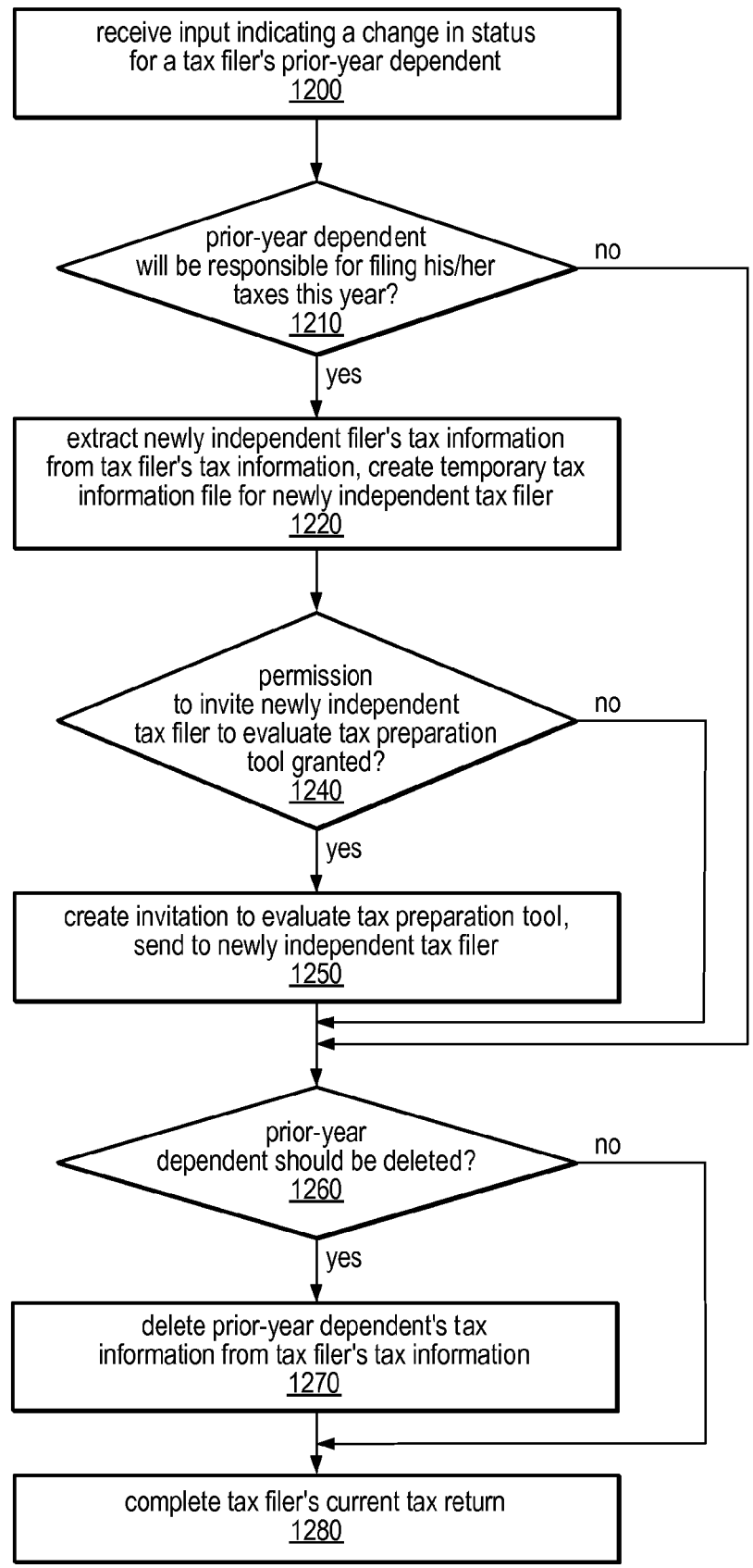
FIG. 12 illustrates an exemplary method for initiating the transition process for a newly independent tax filer, according to one embodiment.

As illustrated in FIG. 12, block 1200, the method includes receiving input indicating a change in status for a prior-year dependent of a given tax filer. The input may in different embodiments be received from the given tax filer using a graphical user interface, as previously described, or by other means (e.g., using a command line interface, scripting language command, configuration file, etc.) As previously described, the particular change in the dependent's status may or may not affect whether the dependent will be responsible for filing his or her own tax return and/or whether or not the dependent may still be claimed as a dependent by the particular tax filer. Therefore, the method may include determining if the prior-year dependent will be responsible for filing his or her own tax return, as in 1210. This determination may be made by prompting the tax filer for input, as previously described, or by other means, in different embodiments. For example, the method may include programmatically determining if the prior-year dependent is likely to be responsible for filing his or her own tax return based on the type of status change (e.g., change of address, graduation, marriage, divorce, reaching a given age, etc.), the income of the prior-year dependent (earned and/or unearned), or other available information, and prompting the tax filer to confirm that this is the case.

If the prior-year dependent will be (or is likely to be) responsible for filing his or her own tax return, as indicated by the positive exit from 1210, the method may include extracting information from the tax filer's tax information that may be useful in preparation of the prior-year dependent's tax return. For example, identifying information (name, address, phone number, birth date, social security number), income and/or employment information, asset and/or liability information, marital status, or disability information corresponding to the prior-year dependent may be extracted from the tax filer's information. As shown in 1220, the method may include creating a temporary tax information file for the prior-year dependent (now also referred to as a newly independent tax filer) and exporting the extracted information such that it is included in the temporary tax information file. As previously noted, this temporary tax information file may be stored locally on a computer system executing a desktop or online (e.g., web-based) tax preparation program, or may be stored remotely (e.g., on a server maintained by an online tax preparation service), in different embodiments. The method may include setting up a temporary registration and/or user account for the newly independent tax filer and associating the temporary tax information file with the temporary registration or account information, in some embodiments. For example, setting up a temporary registration or user account may include establishing a unique user identifier for the newly independent tax filer and a unique password for accessing the newly independent tax filer's tax information.

The method may include obtaining permission from the tax filer to invite the newly independent tax filer to evaluate the tax preparation tool used by the tax filer, as shown in 1240. As previously described, permission may in some embodiments be obtained by prompting the tax filer to grant permission using a graphical user interface of a tax program. In other embodiments, permission may be obtained using other methods (e.g., through exchange of secure electronic messages, by the tax filer logging onto a service to request the evaluation for the newly independent tax filer, or using a command line interface, scripting language command, or configuration file). In some embodiments the operations described in 1220 (e.g., extracting information, creating a temporary tax information file, setting up a temporary registration or account) may not be performed until and unless permission is granted to invite the newly independent tax filer to evaluate the tax program, rather than in response to determining that the prior-year dependent is likely to be responsible for filing his or her own tax return.

If permission is granted to invited the newly independent tax filer to evaluate the tax program, as indicated by the positive exit from 1240, the method may include creating an invitation for the new tax filer to evaluate the tax preparation tool and sending it to the newly independent tax filer, as in 1250. As previously described, the invitation may in some embodiments include one or more generic, custom, or personal messages, instructions for obtaining the tax preparation tool, preliminary information for completing a tax return (e.g., the temporary tax information file containing the information extracted information from the tax filer), electronic coupons, or instructions for obtaining electronic coupons or other authorization mechanisms to allow the newly independent tax filer to evaluate the tax preparation tool at a discount or at no cost. The invitation may be provided to the newly independent tax filer using one or more electronic messages (e.g., using an email address or other electronic address provided by the tax filer), which may display the complete invitation or may display a portion of the invitation information described above, in different embodiments. For example, an email message may indicate that the newly independent tax filer has been invited to evaluate the tax preparation tool and may provide a hyperlink for displaying additional information using a pop-up window within the email application or using a separate browser window. If permission is not granted, as indicated by the negative exit from 1240, no invitation is created or sent, in this example.

In some embodiments, if the prior-year dependent will not be responsible for filing his or her own tax return, as indicated by the negative exit from 1210, the functions illustrated in 1220-1250 of FIG. 12 may not be performed. If the prior-year dependent will be responsible for filing his or her own tax return, but permission is not granted to invite the prior-year dependent to evaluate the tax preparation tool, in some embodiments the temporary tax information file created at 1220 may be automatically deleted. For example, the file may be deleted from storage on the local computer system or from a server on which it may be stored remotely.

In some embodiments, independent of whether the prior-year dependent will be responsible for filing his or her own taxes, the method may include determining if the prior-year dependent should be deleted from the tax filer's tax information and tax return documents, as in 1260. As previously described, this determination may in some embodiments be made by prompting the tax filer to indicate that the prior-year dependent should be deleted using a graphical user interface of the tax program. In other embodiments, the determination may be made programmatically based on the type of status change (e.g., death, change of address, graduation, marriage, divorce, reaching a given age, etc.), the income of the prior-year dependent (earned and/or unearned), or other available information, and confirmed by the tax filer. If the prior-year dependent should be deleted, as indicated by the positive exit from 1260, the method may include disregarding information related to the prior-year dependent in the tax filer's tax information when preparing the tax filer's tax return (e.g., by deleting the information, or marking it "inactive" or "not-applicable") and/or modifying information in response to the prior-year dependent's change of status. For example, in some embodiments, the method may include automatically modifying the number of exemptions on the tax filer's return, modifying the tax filer's filing status (e.g., if the tax filer no longer qualifies as a "head of household"), removing any pre-loaded information about the prior-year dependent's income (e.g., information about interest income or investments held in the prior-year dependent's name), or modifying or removing dependent care expenses of the tax filer's tax return. The method may also include advising the tax filer to change the number of withholding allowances on his or her W-4 in response to deleting the prior-year dependent.

If the prior-year dependent should not be deleted from the tax filer's tax return, the modifications described above may not be applied to the tax filer's return (e.g., if the prior-year dependent will not be responsible for filing his or her own tax return.) In some embodiments, if the prior-year dependent should not be deleted from the tax filer's tax return, but the prior-year dependent will be responsible for filing his or her own tax return, some of the modifications listed above (and/or other modifications) may be applied to the tax filer's tax information and/or tax return. For example, the number of personal exemptions may not change for the tax filer, but income and/or asset information for the prior-year dependent may be omitted when preparing the tax filer's tax return.

Once the determinations described above have been made and responded to, the method may include completing the tax filer's current tax return, as in 1280. If any modifications have been made to the tax filer's tax information (e.g., in response to deleting the prior-year dependent or in response to the prior-year dependent being responsible for his or her own tax return), these modifications may be automatically applied during preparation of the tax filer's tax return.

Figure 13:
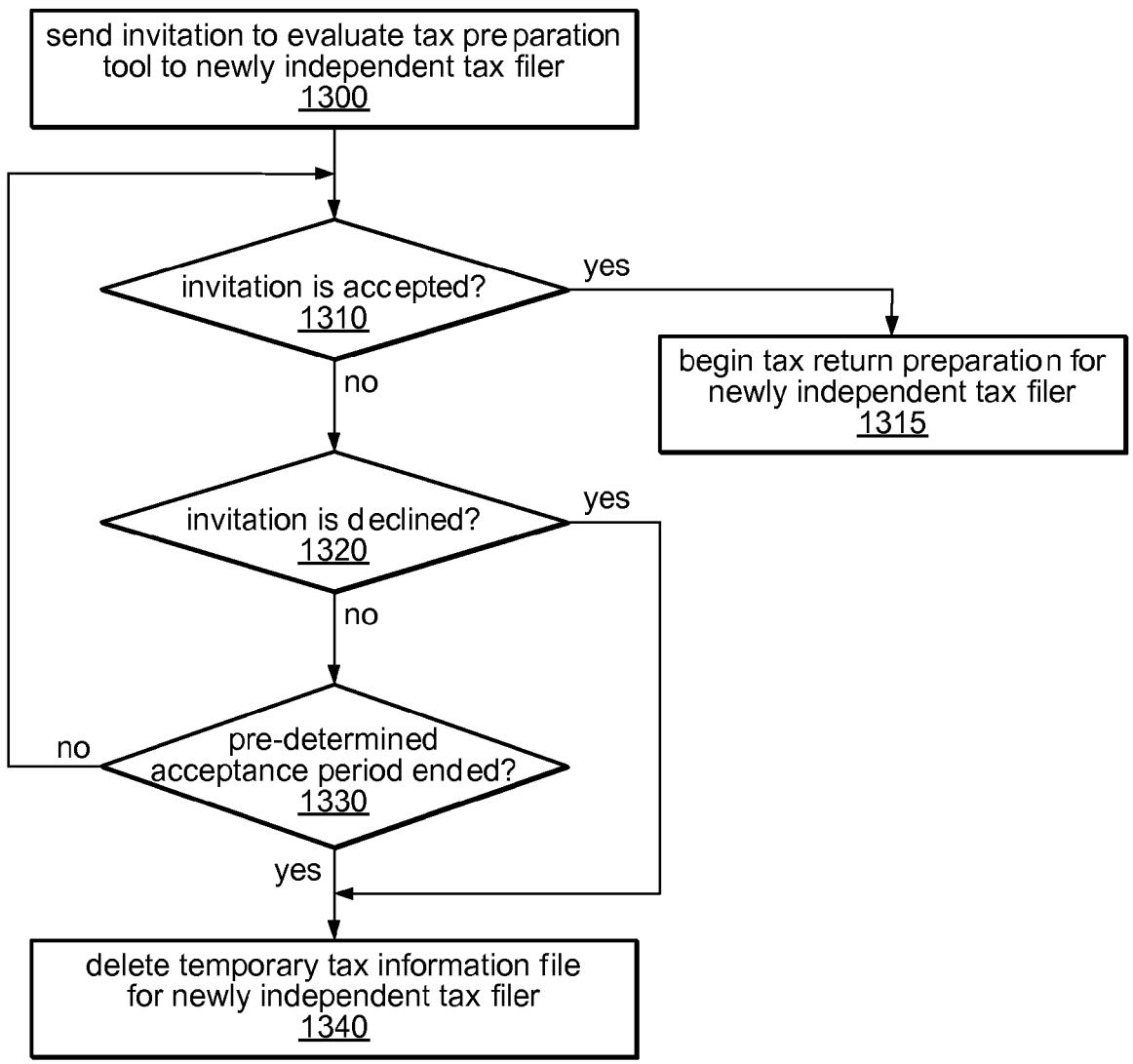
FIG. 13 illustrates an exemplary method for offering an evaluation of a tax program to a newly independent tax filer, according to one embodiment.

The computer-implemented methods for facilitating a transition for a newly independent tax filer may include functionality for addressing security and/or ownership concerns regarding the transfer of information from the tax filer to the newly independent tax filer, including personal information (e.g., name, address, social security number, birth date) and tax-related information (e.g., employment, income, asset and liability information.) FIG. 13 illustrates one embodiment of a method that addresses these issues. In this example, an invitation to evaluate a tax preparation tool is sent to a newly independent tax filer, as in 1300. The invitation may be sent as described herein or in any similar manner, in different embodiments.

The newly independent tax filer may or may not accept the invitation, as shown in 1310. Accepting the invitation may in various embodiments involve one or more of: replying to an electronic message containing the invitation, selecting a hyperlink to access the tax preparation tool, downloading and/or installing the tax preparation tool, registering and/or setting up an account for using a tax preparation service, or replacing a temporary registration or account with an active registration or account, for example. Setting up an active registration or account may include creating a unique identifier and password for the newly independent tax filer or modifying a temporary identifier and/or password established when the temporary tax information file was created, in various embodiments. Accepting the invitation may in some embodiments also include accepting ownership of the information and data in the temporary tax information file; confirming, acknowledging, or authorizing a transfer of ownership of the information and data in the temporary tax information file from the tax filer to the newly independent tax filer; or authorizing the use of the information and data in the temporary tax information file. In some embodiments, the method for accepting the information may include an authentication step, whereby the newly independent tax filer's identity is verified before the temporary tax information file may be used in preparation of the newly independent tax filer's tax return and/or before activating a temporary registration or account set up at the time the temporary tax information was extracted. This authentication may be implemented using any of various known methods for verifying the identity of a computer user and/or for authorizing access to secure information and data, including, but not limited to, methods involving the use of encryption, public and/or private keys, passwords, tax preparation service account numbers, digital signatures, digital identities, or various other types of security protocols.

In some embodiments, a newly independent tax filer may be authorized to evaluate the tax preparation program without registering or setting up an active account. For example, he or she may be instructed to log into an online tax preparation service using a temporary account, or as a "guest" or "visitor", to evaluate the tax preparation program. In such embodiments, the newly independent tax filer may or may not be able to access his or her temporary tax information file. In such embodiments, the newly independent tax filer may or may not be able to store any current tax return documents generated during an evaluation session. Using a temporary, guest, or visitor account may allow the newly independent tax filer to evaluate the tax preparation program for a pre-determined length of time or for a pre-determined number of evaluation sessions without having to purchase a copy of the tax preparation program or execute a service agreement for a tax preparation service until he or she is satisfied that the tax preparation program is suitable for his or her needs.

If the invitation is accepted, as indicated by the positive exit from 1310, the method may include beginning preparation of a tax return for the newly independent tax filer, as in 1315 and as described in more detail below. As noted above, in some embodiments preparation of a tax return may begin without the newly independent registering or setting up an active account, but the tax return documents may not be saved if the newly independent tax filer does not complete the registration or set up an active account before an evaluation period expires or before a tax preparation session ends (e.g., before the newly independent tax filer "quits" the tax preparation program or closes one or more browser windows containing tax return documents.)

In this example, if the invitation is not accepted, it may or may not be explicitly declined, as shown in 1320. Explicitly declining the invitation may include one or more of: replying to an electronic message containing the invitation, selecting a hyperlink to decline the invitation, deleting the invitation, deleting one or more attachments to the invitation (e.g., a temporary tax information file containing information extracted from another tax filer's information, as described herein), and accessing a server of a tax preparation service to decline the invitation and/or delete a temporary tax information file, for example.

In some embodiments, the method may include deleting the temporary tax information file for the newly independent tax filer in response to the invitation being explicitly declined, as indicated by the positive exit from 1320 and by block 1340. For example, the temporary tax file may be deleted from a server for an online tax preparation service in response to the newly independent tax filer declining the invitation. In addition, the method may include disabling and/or deleting any temporary registration or account information if the invitation is declined.

If the newly independent tax filer does not accept the invitation and does not explicitly decline the invitation, as indicated by the negative exit from 1330, the method may include waiting for a pre-determined acceptance period to expire before assuming that the invitation will not be accepted. In the example illustrated in FIG. 13, this is shown as a feedback loop from block 1330 to block 1310. In this example, once the pre-determined acceptance period has ended, as indicated by the positive exit from 1330, the temporary tax information file for the newly independent tax filer may be deleted and any temporary registrations or accounts may be disabled or deleted, as described herein.

The functionality depicted in FIG. 13 and described above may in some embodiments be used to facilitate the transition from being a dependent tax filer to being a newly independent tax filer in a secure manner. For example, in some embodiments this functionality may limit access to the temporary tax information file described herein to the tax filer until and unless the invitation is accepted, and to the newly independent tax filer once the invitation is accepted. In another example, maintaining the temporary tax information on a secure server and automatically deleting it in response to the invitation being declined or an acceptance period expiring may in some embodiments prevent the use of the temporary tax information for purposes other than those authorized as described above. The methods may also prevent unauthorized use of temporary tax information by explicitly managing the transfer of ownership of the temporary data, as described above.

Figure 14:
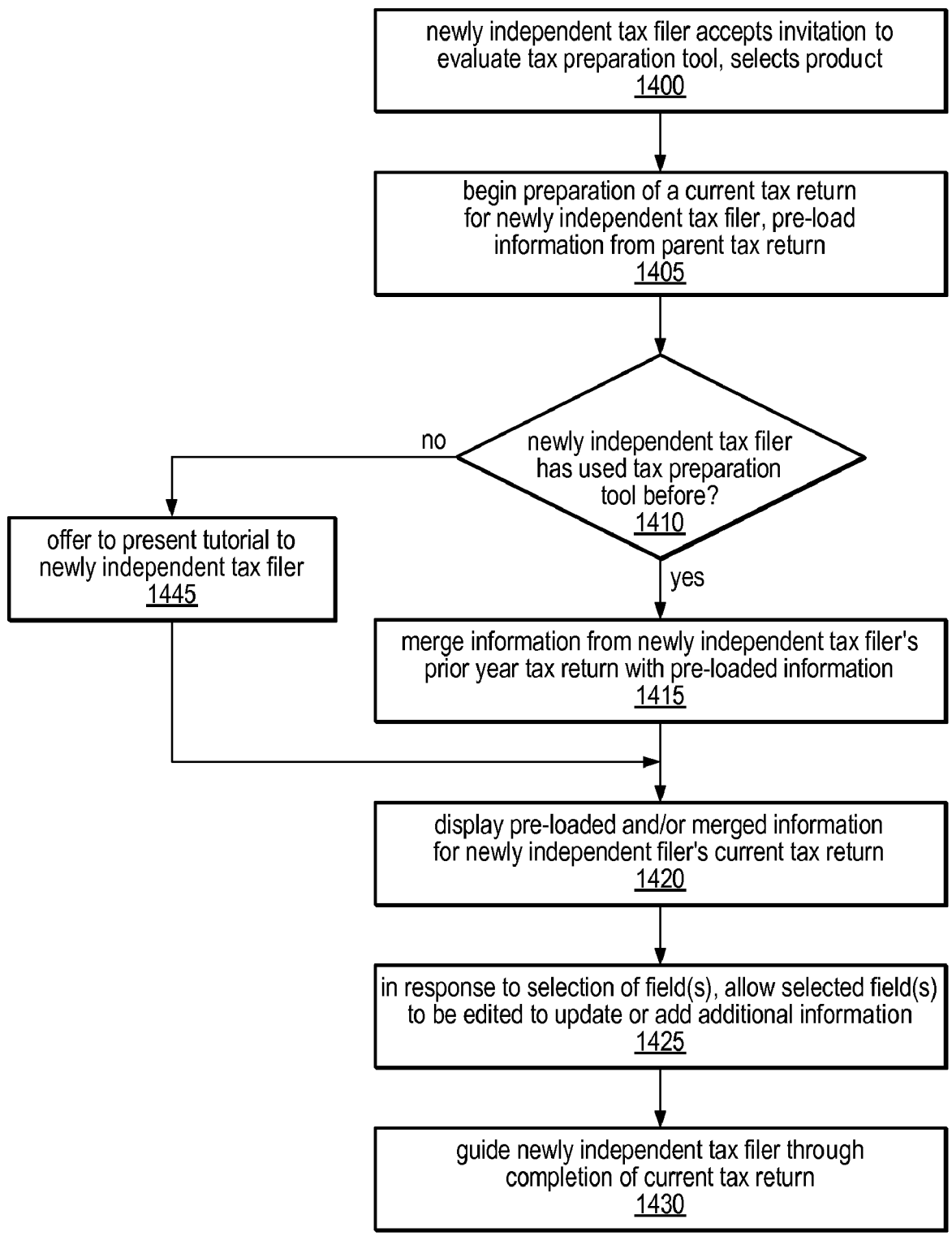
FIG. 14 illustrates one embodiment of a method for assisting a newly independent tax filer in preparation of a current tax return.

As previously described, the computer-implemented methods for facilitating a transition for a newly independent tax filer may include functionality for pre-loading temporary tax information into a tax return for the newly independent tax filer and for adding or modifying information and data in order to complete preparation of the tax return. FIG. 14 illustrates this functionality, according to one embodiment. In this example, the newly independent tax filer accepts an invitation to evaluate a tax preparation tool, as described above. As illustrated in 1400 and previously described, the method may in some embodiments include the newly independent tax filer selecting a particular format, version, or revision of the tax preparation tool (i.e., a particular product) to evaluate. In other embodiments, only one tax preparation tool may be offered for evaluation.

Once the invitation has been accepted, and any necessary authorization or authentication has been successfully performed, preparation of a current tax return for the newly independent tax filer may begin, as in 1405. As noted above, accepting the invitation may include registering for a tax preparation service, in some embodiments. In other embodiments, beginning preparation of a tax return may include registering to receive software downloads and updates, setting up an account for receiving tax preparation services and/or software downloads and updates online, or registering a downloaded or installed software package including the tax preparation tool. In the example illustrated in FIG. 14, beginning preparation of a tax return may also include pre-loading information extracted from a parent tax filer's return (e.g., from a temporary tax information file) into various fields of the current tax return, such as is illustrated in FIGS. 11A and 11B.

In some embodiments, beginning preparation of a tax return may also include pre-loading various fields of the current tax return with default information that may or may not be dependent on available information about the newly independent tax filer. For example, in some embodiments the number of personal exemptions may have a default value of "1" for all new users, i.e., those for which no prior-year tax documents are found or imported upon invocation of the tax preparation tool (automatically or based on a command line or configuration option). In other embodiments, the number of personal exemptions may have a default value of "1" only for new or returning users who are programmatically determined to be probable independent tax filers (e.g., those for which available information or data indicates that they are not likely to be claimed as the dependent of another tax filer.) As previously described, pre-loaded and default values may be modified later by the newly independent tax filer.

In some embodiments, the methods may include determining if the newly independent tax filer has used the tax preparation tool (e.g., a previous revision of the same or a different format/version of the tax preparation tool) before, as shown in 1410. For example, if the newly independent tax filer has previously filed his or her own tax return (but was still claimed as a dependent by a parent tax filer at the time) the newly independent tax filer may be familiar with the tax preparation tool or a similar tax preparation tool. The determination may be made by prompting the newly independent tax filer to indicate if he or she has used the tax preparation tool before using a graphical user interface, such as the one described herein, or by other means (e.g., by searching local memory or remote storage on a server for tax information files or tax documents for the newly independent tax filer.)

If the newly independent tax filer has not used the tax preparation tool before, as indicated by the negative exit from 1410, the method may include offering presentation of a new user tutorial to the newly independent tax filer, as in 1445. In various embodiments, a new user tutorial may automatically be presented to the newly independent tax filer in response to the invitation being accepted, or it may be invoked at any point during preparation of the newly independent tax filer's tax return by selecting this functionality using a graphical user interface input, command line option, scripting language command, or configuration file. In some embodiments, the newly independent tax filer may also be offered an opportunity to evaluate related software programs, such as accounting or personal finance programs configured to exchange data with the tax preparation tool.

If the newly independent tax filer has used the tax preparation tool before, as indicated by the positive exit from 1410, information and/or data from one or more previous tax return documents may be imported and merged with any other pre-loaded information, as shown in 1415. For example, a newly independent tax filer may have filed a form 1040EZ in a previous tax year and information from this form may be imported into a form 1040 for a current tax return. As previously described (e.g., with respect to FIG. 7) the newly independent tax filer may indicate an online or local source for prior-year tax information to be imported for possible use in preparing the current tax return document.

In the example illustrated in FIG. 14, once any available information and data have been pre-loaded or otherwise imported into the current tax return (e.g., into one or more electronic documents used in preparation of the current tax return) the current tax return document(s) may be displayed for the newly independent tax filer, as in 1420. The display may be similar to that illustrated in FIG. 11A, in one embodiment, or may be formatted differently and/or include more, fewer, or different information and data than that illustrated in the exemplary display shown in FIG. 11A. For example, the displayed information may include pre-loaded information and data, information and data imported from a previous tax return, and information and data merged and/or calculated from pre-loaded and/or imported information and data, in different embodiments.

The data and information displayed for the newly independent may be selected and edited to add, modify, or re-calculate the information and data, as in 1425. Selection and modification of the information and data may be implemented using a graphical user interface, such as that described herein (e.g., with respect to FIG. 11B), or using a different type of interface, such as a scripting language or command line interface, in different embodiments. The tax preparation tool may guide the newly independent tax filer through completion of his or her tax return, as in 1430, which may include such selecting and modifying of data and information contained in any number of tax return documents and/or input screens. For example, the newly independent tax filer may be prompted to add current employment and income information copied from (or imported from) one or more forms W-2.

Guiding the newly independent tax filer through completion of his or her tax return may in some embodiments include identifying (based on available information) specific tax situations that may be applicable to the newly independent tax filer. For example, if change in status information for the newly independent tax filer includes an indication that he or she recently graduated from college, the newly independent tax filer may be presented with an opportunity to input information about any outstanding educational loans. In another example, if change in status information for the newly independent tax filer includes an indication that the newly independent tax filer moved into or out of an assisted living center, he or she may be presented with an opportunity to input information about medical expenses incurred during the tax year. Guiding the newly independent tax filer through completion of his or her tax return may in some embodiments include recommending a particular tax form to be filed, dependent on the newly independent tax filer's tax information (e.g., recommending a 1040EZ form, rather than a 1040 form, or vice versa, for some newly independent tax filers.)

Completion of the current tax return may in some embodiments include storing a representation of applicable tax documents to be physically filed in local or remote (e.g., online) memory, and/or may include electronically filing electronic versions of applicable tax return documents. Note that intermediate tax return documents (e.g., partially completed documents, snapshots of input screens and/or documents being prepared, or alternate tax return documents generated for comparison of different tax strategies) may also be stored locally or remotely at any point during preparation of the current tax return and/or after preparation is complete (e.g., one or more archive copies may be stored for different purposes).

Note that the user interface mechanisms and elements as illustrated and described are exemplary and are not intended to be limiting, and various modifications to or variations of the mechanisms and elements are possible, as are alternative user interface mechanisms and elements that are configured to perform similar functions.

Note also that the methods described herein may be performed by an individual tax filer (e.g., a parent tax filer or a newly independent tax filer) using a personal version of the tax program to complete his or her own tax return, or by a tax preparation professional using a professional version of the tax program to complete one or more tax returns on behalf of a parent tax filer and/or a newly independent tax filer (e.g., a prior-year dependent of a parent tax filer who is client of the tax professional.)

Exemplary System

Figure 15:
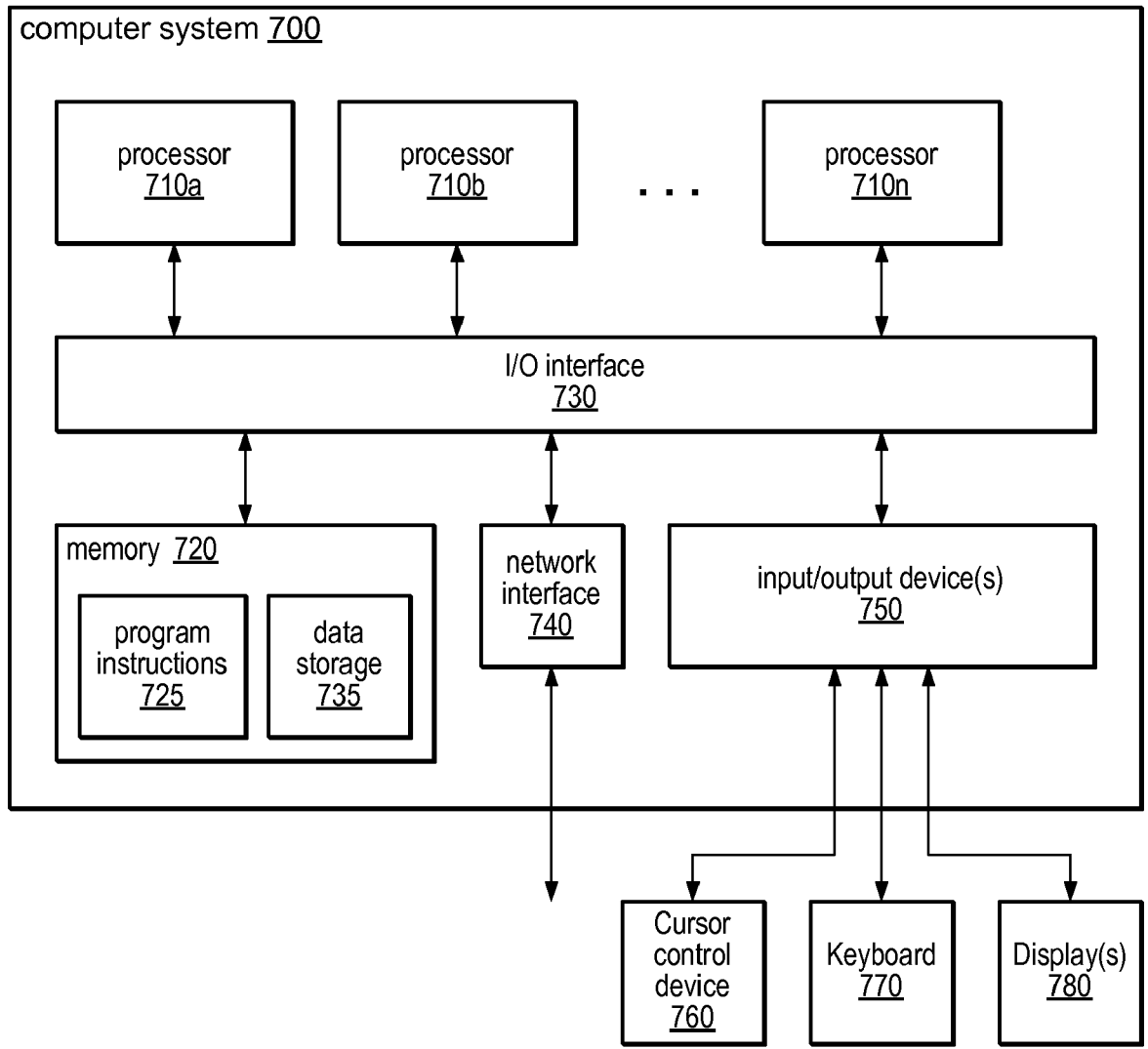
FIG. 15 illustrates an exemplary computer system on which embodiments may be implemented.

Various embodiments of a system and method for accessing and displaying previous tax return information in tax preparation software programs, as described herein, may be executed on one or more computer systems, which may interact with various other devices. One such computer system is illustrated by FIG. 15. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements (e.g., a current tax program and its data store) may be implemented via one or more nodes of computer system 700 that are distinct from those nodes implementing other elements (e.g., a previous version of the tax program and its data store).

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 15, memory 720 may include program instructions 725, configured to implement embodiments of a system and method for accessing and displaying previous and/or extracted tax return information in tax preparation software programs as described herein, and data storage 735, comprising various documents, tables, databases, etc. accessible by program instructions 725. In one embodiment, program instructions 725 may include the software elements illustrated in FIGS. 8, 9, 10A, and 10B (e.g., current tax program 200 and previous tax programs 100 and/or 150) and data storage 736 may include the data illustrated in FIGS. 8, 9, 10A, and 10B (e.g., previous tax return information 102, current tax document(s) 220, and previous tax document(s) 120 and 155, when and if stored to data storage 736). In other embodiments, different software elements and data may be included.

Those skilled in the art will appreciate that computer system 700 is merely illustrative and is not intended to limit the scope of the present invention. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The methods may be implemented in software, hardware, or a combination thereof, in different embodiments. In addition, the order of method may be changed, and various elements may be added, reordered, combined, omitted, modified, etc. Various modifications and changes may be made as would be obvious to a person skilled in the art having the benefit of this disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A computer-implemented method comprising:
   receiving, from an independent filer, user input indicating that a prior-year dependent of the independent filer will file his or her own tax return, and in response to said user input:
  extracting information relevant to the dependent from a file comprising tax information for the independent filer,
  creating a temporary tax information file for the dependent, and
  canceling information, corresponding to the dependent, in the file comprising tax information for the independent filer for use when preparing a current tax return for the independent filer, wherein said canceling information is performed in response to receiving user input indicating that the dependent should be deleted from the independent filer's list of dependents for the current tax return for the independent filer;
creating, using a processor, an invitation for the dependent to evaluate a tax preparation tool;
sending, using the processor, the invitation for the dependent to evaluate the tax preparation tool to the dependent via electronic communication using an electronic address specified by the independent filer;
receiving input from the dependent indicating that the dependent accepts the invitation to evaluate the tax preparation tool, and in response to said input:
  creating account information for the dependent,
  creating, using the processor, a new file comprising tax information for the dependent based in part on information comprised in the temporary tax information file for the dependent,
  associating the new file with the account information, and
  pre-loading, using the processor, at least a portion of the tax information comprised in the new file into the tax preparation tool; and
completing, using the processor, the current tax return for the independent filer.

2. The method of claim 1, further comprising obtaining permission from the independent filer to offer an evaluation of the tax preparation tool to the dependent prior to said extracting information relevant to the dependent;
  wherein said extracting information relevant to the dependent and said creating the temporary tax information file for the dependent are performed only if input received from the independent filer indicates that the independent filer grants permission to offer an evaluation of the tax preparation tool to the dependent.

3. The method of claim 1, further comprising importing tax information from a prior-year tax return into the new file in response to receiving input from the dependent indicating that the dependent completed the prior-year tax return using a version of the tax preparation tool.

4. The method of claim 1, further comprising obtaining permission from the independent filer to offer an evaluation of the tax preparation tool to the dependent prior to said creating an invitation;
  wherein said creating the invitation and said sending the invitation are performed only if input received from the independent filer indicates that the independent filer grants permission to offer an evaluation of the tax preparation tool to the dependent.

5. The method of claim 1, further comprising deleting the temporary tax information file for the dependent in response to receiving input from the dependent indicating that the dependent declines the invitation to evaluate the tax preparation tool.

6. The method of claim 1, further comprising deleting the temporary tax information file for the dependent if a pre-determined period of time passes without input being received from the dependent regarding the invitation.

7. The method of claim 1, further comprising presenting a new user tutorial for the tax preparation tool to the dependent in response to receiving input from the dependent indicating that the dependent accepts the invitation to evaluate the tax preparation tool.

8. The method of claim 1, wherein the information relevant to the dependent comprises one or more of: the dependent's name, the dependent's social security number, the dependent's birth date, the dependent's address, the dependent's telephone number, the user's address, the user's telephone number, the dependent's prior-year income, the dependent's prior-year taxes owed, the dependent's prior-year taxes paid, the dependent's prior-year marital status, the dependent's prior-year disability status, the dependent's prior-year student status, the dependent's prior-year assets, and the dependent's prior-year liabilities.

9. The method of claim 1, wherein said creating the temporary tax information file for the dependent comprises:
  exporting the extracted information to the temporary tax information file; and
  storing the temporary tax information file in a secure online location accessible only by the dependent.

10. The method of claim 1, wherein said creating the temporary tax information file for the dependent comprises prompting the independent filer to export the extracted information to the temporary tax information file and storing the temporary tax information file locally, and
  wherein the method further comprises prompting the independent filer to send the tax file and an invitation to evaluate the tax preparation tool to the dependent.

11. A computing system, comprising: one or more processors; and
  memory coupled to the one or more processors, wherein the memory is configured to store program instructions executable by the one or more processors to implement a tax preparation tool configured to:
    receive user input from an independent filer indicating that a prior-year dependent of the independent filer will file his or her own tax return, and in response to said user input to:
      extract information relevant to the dependent from a file comprising tax information for the independent filer,
      create a temporary tax information file for the dependent, and
      cancel information, corresponding to the dependent, in the file comprising tax information for the independent filer, wherein the tax preparation tool is configured to disregard said information in response to receiving user input indicating that the prior-year dependent should be deleted from the independent filer's list of dependents for a current tax return for the independent filer;
    create an invitation for the dependent to evaluate the tax preparation tool; send the invitation to the dependent on behalf of the independent filer via electronic communication using an electronic address specified by the independent filer;
    receive input from the dependent indicating that the dependent accepts the invitation to evaluate the tax preparation tool, and the tax preparation tool further configured to:
      create account information for the dependent, create a new file comprising tax information for the dependent based in part on information comprised in the temporary tax information file for the dependent, associate the new file with the account information, and pre-load at least a portion of the tax information comprised in the new file into the tax preparation tool; and complete the current tax return for the independent filer.

12. The system of claim 11, wherein the tax preparation tool is further configured to obtain permission from the independent filer to offer an evaluation of the tax preparation tool to the dependent prior to extracting said information relevant to the dependent from a file comprising tax information for the independent filer;

wherein extracting said information relevant to the dependent from the file comprising tax information for the independent filer and creating the temporary tax information file for the dependent are performed only if input received from the independent filer indicates that the independent filer grants permission to offer an evaluation of the tax preparation tool to the dependent.

13. The system of claim 11, wherein in response to receiving input from the dependent indicating that the dependent completed a prior-year tax return using a version of the tax preparation tool, the tax preparation tool is further configured to import tax information from the prior-year tax return into the new file.

14. The system of claim 11, wherein the tax preparation tool is further configured to obtain permission from the independent filer to offer an evaluation of the tax preparation tool to the dependent prior to creating said invitation, and wherein creating said invitation and sending said invitation are performed only if input received from the independent filer indicates that the independent filer grants permission to offer an evaluation of the tax preparation tool to the dependent.

15. The system of claim 11, wherein in response to receiving input from the dependent indicating that the dependent declines the invitation to evaluate the tax preparation tool, the tax preparation tool is further configured to delete the temporary tax information file for the dependent.

16. The system of claim 11, wherein in response to a pre-determined period of time passing without input being received from the dependent regarding the invitation, the tax preparation tool is further configured to delete the temporary tax information file for the dependent.

17. The system of claim 11, wherein in response to receiving input from the dependent indicating that the dependent accepts the invitation to evaluate the tax preparation tool, the tax preparation tool is further configured to present a new user tutorial for the tax preparation tool to the dependent.

18. The system of claim 11, wherein to create the temporary tax information file for the dependent, the tax preparation tool is configured to:

export the extracted information to the temporary tax information file; and store the temporary tax information file in a secure online location accessible only by the dependent.

19. The system of claim 11, wherein the tax preparation tool is executed remotely on behalf of the independent filer via an online tax preparation service.

20. A computer-readable storage medium, comprising program instructions computer-executable on a processor to implement:

receiving input, from an independent filer, indicating that a prior-year dependent of the independent filer will file his or her own return, and in response to said input:

extracting information relevant to the dependent from a file comprising information for the independent filer, creating a temporary tax information file for the dependent, and deleting information, corresponding to the dependent, from the file comprising information for the independent filer for use when preparing a current tax return for the independent filer, wherein said deleting information is performed in response to receiving user input indicating that the dependent should be deleted from the independent filer's list of dependents for the current tax return for the independent filer;

creating an invitation for the dependent to evaluate a tax preparation tool;

sending the invitation for the dependent to evaluate the tax preparation tool to the dependent via electronic communication using an electronic address specified by the independent filer;

receiving input from the dependent indicating that the dependent accepts the invitation to evaluate the tax preparation tool, and in response to said input:

creating account information for the dependent, creating a new file comprising tax information for the dependent based in part on information comprised in the temporary tax information file for the dependent, associating the new file with the account information, and pre-loading at least a portion of the tax information comprised in the new file into the tax preparation tool; and completing the current tax return for the independent filer.

21. The medium of claim 20, further comprising program instructions computer-executable to implement importing tax information from a prior-year tax return into the new file in response to receiving input indicating that the dependent completed the prior-year tax return using a version of the tax preparation tool.

22. The medium of claim 20, further comprising program instructions computer-executable to implement obtaining permission from the independent filer to offer an evaluation of the tax preparation tool to the dependent prior to said creating an invitation, wherein said creating an invitation and said sending the invitation are performed only if input received from the independent filer indicates that the independent filer grants permission to offer an evaluation of the tax preparation tool to the dependent.

23. The medium of claim 20, further comprising program instructions computer-executable to implement deleting the temporary tax information file for the dependent in response to receiving input indicating that the dependent declines the invitation to evaluate the tax preparation tool.

24. The medium of claim 20, further comprising program instructions computer-executable to implement deleting the temporary tax information file for the dependent if a pre-determined period of time passes without input being received from the dependent regarding the invitation.

25. The medium of claim 20, wherein said creating a temporary tax information file for the dependent comprises:

exporting the extracted information to the temporary tax information file; and storing the temporary tax information file in a secure online location accessible only by the dependent.

* * * * *